United States Patent [19]
Ishikawa

[11] Patent Number: 5,933,527
[45] Date of Patent: Aug. 3, 1999

[54] FACIAL IMAGE PROCESSING METHOD AND APPARATUS

[75] Inventor: Masaki Ishikawa, Suwa, Japan

[73] Assignees: Seiko Epson Corporation, Tokyo; A. I. Soft, Inc., Matsumoto, both of Japan

[21] Appl. No.: 08/665,163

[22] Filed: Jun. 14, 1996

[30] Foreign Application Priority Data

Jun. 22, 1995 [JP] Japan ................................. 7-156531

[51] Int. Cl.⁶ .............................. G06K 9/00; G06K 9/34; G06K 9/46
[52] U.S. Cl. ......................... 382/190; 382/118; 382/173
[58] Field of Search .................................. 382/190, 118, 382/209, 100, 117, 156, 103, 107, 173, 199, 203; 340/825.34

[56] References Cited

U.S. PATENT DOCUMENTS

| | | | |
|---|---|---|---|
| 5,008,946 | 4/1991 | Ando ........................................ | 382/104 |
| 5,280,530 | 1/1994 | Trew et al. ............................. | 382/103 |
| 5,412,738 | 5/1995 | Brunelli et al. ......................... | 382/115 |
| 5,450,504 | 9/1995 | Calia ....................................... | 382/118 |
| 5,631,975 | 5/1997 | Riglet et al. ............................ | 382/173 |
| 5,719,951 | 2/1998 | Shackleton et al. .................... | 382/118 |

OTHER PUBLICATIONS

"Feature Extraction from Faces Using Deformable Templates," Yuille et al. IEEE Computer Vision and Pattern Recognition, pp. 104–108, 1989.

*Primary Examiner*—Thomas D. Lee
*Assistant Examiner*—Wenpeng Chen
*Attorney, Agent, or Firm*—Michael T. Gabrik

[57] ABSTRACT

A method and apparatus for appropriately and without error extracting specific feature areas of a facial image, and outputting accurate coordinate data for the extracted facial features for use in such applications as three-dimensional morphing, image blending, or facial image identification. Preferably, the inclusion of a searching range setting unit for each facial feature to be extracted develop a searching range for extracting each facial feature referenced to individual points specified by the user for the mouth and left and right eyes based on the coordinate data of those specified points. The areas of those facial features are then extracted from within the defined searching ranges by area extractors, and the coordinate data of the contour points forming the contours of those areas is extracted by contour point extractors. Based on the coordinate values of the specific point specified for each facial feature area, extraction content evaluators then evaluate the relative positions of the extracted areas to determine whether said areas were correctly extracted.

56 Claims, 17 Drawing Sheets

FACIAL IMAGE PROCESSING METHOD AND APPARATUS

BACKGROUND OF THE INVENTION

1. Field of the Invention

The present invention generally relates to facial image processing techniques, and more specifically, an improved facial image processing method and apparatus for generating feature coordinate information corresponding to characteristic parts of a facial image useful in facial morphing, identification or blending operations.

2. Description of the Related Art

To merge two facial images, it is first necessary to extract the eyes, eyebrows, mouth, facial contours, and other facial features, calculate the coordinate data of the representative contour points forming the contours of each of the extracted features based on the extracted image data, and then transfer the calculated coordinate data to the image-merging processor in order to match a wire frame model of the facial shape to the actual facial image.

One facial feature extraction method commonly used detects the image edges based on the coordinate data and black/white density data of the input image data, and digitizes the image edges to extract the facial features. With this method, however, much noise is introduced into the digital image during processing, and processing of images rich in color information is limited. To resolve these problems, recently developed methods attempt to distinguish and extract the facial features using the color information contained in the image.

One such method follows a predetermined program to process and extract the facial features based on the coordinate and color data of the input image data. This method first stores the input image data to an image data memory, and then extract the facial features in a predetermined sequence, e.g., the mouth (i.e., lips) first, followed by the eyes, the eyebrows, and other facial parts, according to a predefined program. To extract the mouth, for example, the complete facial image data is queried to locate the image area using the YIQ color system, where the Q component, which expresses lip color, exceeds a certain threshold value. This area is extracted as the mouth area, which is then processed to obtain and output the coordinate data for the representative contour points forming the contour of the mouth and circumscribing lips. The coordinate data for the eyes and eyebrows is processed in the same manner to extract the respective areas and obtain the corresponding coordinate data.

As described above, these refined color techniques follow a predefined program to extract the facial feature areas from the complete image data, and to obtain the coordinate values for the extracted feature areas. In the mouth extraction process, for example, the collection of image areas in which the Q component exceeds a known threshold value is determined to be the mouth, and the mouth area is thus extracted based on the value of the Q components. However, when there is a Q component (red) area in the background of the facial image exceeding a predetermined saturation or level size, or when there is a red pattern exceeding a predetermined level in the subject's clothing, these areas may be mistakenly determined to be the area of a mouth. Naturally, this results in an inaccurate feature characterization of the input facial image. Significant processing time is also required to extract plural facial features, including the eyes, eyebrows, and mouth, from the complete facial image data, particularly in 16 bit high color or 24 bit true color applications.

OBJECTS OF THE INVENTION

It is therefore an object of the present invention to greatly reduce the processing time required for facial feature extraction, enable accurate facial feature extraction with minimal errors, and reliably extract the contour points of the extracted individual feature areas by setting searching areas having a defined, limited range, and extracting the facial feature areas only within each of the set searching areas.

It is a further object of the present invention to enable high precision extraction of facial feature areas by a post processing function for evaluating the extracted content.

SUMMARY OF THE INVENTION

In accordance with these and related objects, image processing according to the present invention comprises 1) preliminary or rough image feature identification based on analysis of the scanned subject image or through acceptance of user identified specific feature points; 2) procurement of image search ranges for each image feature identified with the user-supplied specific feature points in order to generate accurate image search ranges, where the boundaries and characteristic identifiers of a particular search range depends on the classification of the image feature to which it relates; and 3) characteristic extraction for each image feature based on analyzing the image portions defined by the procured search ranges. Preferably, in the case of facial image feature extraction, the user will select one or more points on a digitized image, each corresponding to at least one facial feature (e.g. left and right eyes, nose and mouth) in which characteristic information is desired for further processing or identification purposes.

Facial image processing according to the present preferred embodiments of the invention further involves having a user select points at least roughly approximating the location of the right and left eyes and mouth of the facial image. Then, search ranges are determined for the mouth, right and left eyes, eyebrows, and general facial contour.

Further, preferably, the searching range for the mouth area may be set in the relative x-axis and y-axis directions to include the mouth area referenced to the point specified as the mouth based on the difference between the x-coordinate data of the points specified as the right and left eyes, wherein the x-coordinate axis represents the side-to-side direction of the facial image and the y-coordinate axis represents the vertical direction of the facial image. Alternatively, the searching range for the mouth area may be set in the x-axis and y-axis directions to include the mouth area referenced to the point specified as the mouth based on the difference between the x-coordinate data of the points specified as the right and left eyes, and the average of the differences between the y-axis coordinate of the point specified as the mouth and the y-axis coordinates of the points specified as the right and left eyes. Again, x-coordinate axis here represents the side-to-side direction of the facial image and the y-coordinate axis represents the vertical direction of the facial image.

Moreover, the searching ranges for the eyes may be set in the x-axis and y-axis directions to include the eyes referenced to the points specified as the right and left eyes based on the difference between the x-axis coordinate data of the points specified as the right and left eyes. Likewise, the searching ranges for the eyebrows are set in the x-axis and y-axis directions to include the eyebrows referenced to the points specified as the right and left eyes based on the difference between the x-axis coordinate data of the points specified as the right and left eyes.

Also, preferably, the searching ranges for the facial contours in the areas at the eye height in the y-axis direction may be set in the relative x-axis and y-axis directions to include the facial contours referenced to the points specified as the right and left eyes based on the average of the differences between the y-axis coordinate of the point specified as the mouth and the y-axis coordinates of the points specified as the right and left eyes, where the x-coordinate axis represents the side-to-side direction of the facial image and the y-coordinate axis represents the vertical direction of the facial image. Plus, the searching ranges for the facial contours in the areas at the mouth height in the y-axis direction may be set in the x-axis and y-axis directions to include the facial contours referenced to the point specified as the mouth based on the average of the differences between the y-axis coordinate of the point specified as the mouth and the y-axis coordinates of the points specified as the right and left eyes. Finally, the searching range for the facial contour in the area of the mouth in the x-axis direction may be set in the x-axis and y-axis directions to include said facial contour referenced to the point specified as the mouth based on the average of the differences between the y-axis coordinate of the point specified as the mouth and the y-axis coordinates of the points specified as the right and left eyes.

To improve characteristic feature extraction accuracy, facial image processing according to the presently preferred embodiments may comprise, in addition to preliminary image feature identification, image search range development and feature characteristic extraction, the evaluation of the relative positions of the extracted feature images based on the coordinate values of the previously supplied or determined specific points in the facial feature areas to determine whether the facial features were, in fact, correctly extracted.

In the context of the mouth area of a scanned facial image, the aforementioned evaluation device or process comprises: comparison of the y-axis coordinates of the right and left end points in the x-axis direction of the extracted mouth area with the y-axis coordinate of the midpoint in the x-axis direction at the top edge of the extracted mouth area. When the y-axis coordinate of the midpoint in the x-axis direction is smaller than the y-axis coordinate of either right or left end point in the x-axis direction of this mouth area, the extracted mouth area is determined to represent an open mouth, the extracted mouth image is determined to include the lower lip only, and a searching range for additionally extracting the upper lip is therefore set.

In addition, evaluation may further preferably comprise determination whether the eyes or mouth were correctly extracted by determining whether the respective points specified by the user as the center of the eyes or mouth are contained within the extracted areas. Also, evaluation could include verification of correct eyebrow locations by evaluating the positions of the coordinates of the right and left end points of the extracted eyebrow area relative to the coordinates of the point specified as the adjacent eye.

Alternatively, facial image processing according to the present invention may comprise: 1) extraction of image regions or areas corresponding to each facial feature using a coordinate system, wherein the x-coordinate axis represents the side-to-side direction of the facial image and the y-coordinate axis represents the vertical direction of the facial image; 2) procurement of the contour points forming the contours of the eyes and mouth in the corresponding facial feature areas extracted during facial image region extraction; 3) development, from these contour points the coordinates of the right and left end points in the x-axis direction of the facial feature image regions; 4) definition of a searching range with a width in the x-axis direction equal to a known $\frac{1}{n}$ fraction of the distance between the right and left end points for each respective facial feature area in each area near the midpoint between its corresponding right and left end points; and finally 5) determination of the coordinates of the top and bottom end points in the y-axis direction of the eye or mouth facial feature areas within their respective defined searching ranges. Moreover, the coordinates of the contour points between the obtained four right, left, top, and bottom end points are obtained with the x-axis coordinate thereof calculated as the average of the x-axis coordinates of the contour points on either side of the contour point being calculated.

Also, facial image processing according to this embodiment may further comprise image area verification through comparison of the image positions of the extracted areas with respect to the coordinate values of a specific point in each facial feature area to determine whether such facial feature areas were correctly extracted. When the extracted area is the mouth area, preferably this verification step or apparatus involves determining whether a line connecting the right and left end points in the x-axis direction of the mouth area is sloped greater than a predetermined angle relative to a line through a specific point in each of the right and left eyes. Also, when the extracted area is a facial contour area, the plural contour points forming the facial contour may be processed in units of three adjacent contour points; the coordinates of the middle of each three contour points are compared with the average of the coordinates of the two adjacent contour points; and the average of the coordinates of the two adjacent contour points are substituted for the coordinates of the middle contour point if the position of the middle contour point is determined to be to the inside of the face relative to the adjacent contour points of the subject facial image.

Based on the coordinates of the three points specified by the user for the right and left eyes and the mouth, the techniques of the present invention set a separate searching range for the mouth and each of the eyes, and search for the respective facial features only within those limited searching ranges. As a result, processing is greatly simplified when compared with methods extracting facial features from the entire facial image, and the processing time can therefore be greatly reduced. Furthermore, because the respective facial features are extracted from within defined image areas, false extraction of other facial features in place of the desired facial features rarely occurs, and the facial feature the user wishes to extract can be reliably extracted.

In addition, after extracting the areas of the facial features, the contour points of the eyes and mouth may be extracted from the extracted feature areas, the coordinates of the right and left end points in the x-axis direction of the eye or mouth image may be obtained, and then the coordinates of the top and bottom end points in the y-axis direction can be obtained. Before obtaining the coordinates of the top and bottom end points in the y-axis direction, however, a searching range with a width in the x-axis direction equal to a known $\frac{1}{n}$ fraction of the distance between the right and left end points should be set, and the top and bottom end points in the y-axis direction are obtained within this searching range. As a result, the top and bottom contour points at the highest and lowest points representative of the image can be obtained reliably without scanning and digitization noise effects.

After the areas of the desired facial features are extracted, the relative positions of the extracted areas may be evaluated based on the coordinates of specific points in each of the facial feature areas. It is therefore possible to check whether the facial features were correctly extracted and to automatically reprocess the image when the feature extraction appears wrong when evaluating these points, and errors in the extraction process can therefore be significantly reduced.

Other objects and attainments together with a fuller understanding of the invention will become apparent and appreciated by referring to the following description of specific preferred embodiments and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

Figure 1:
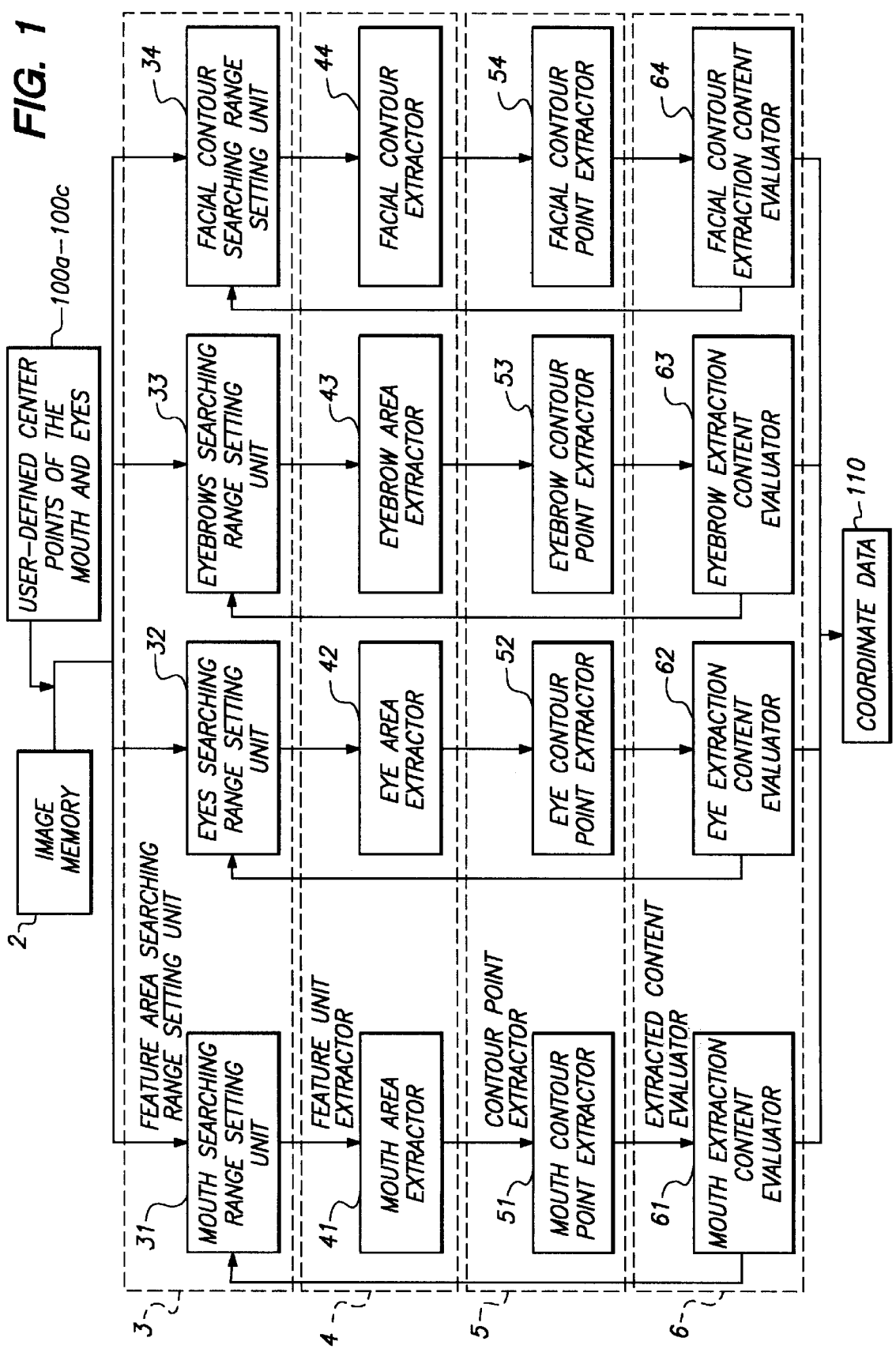
FIG. 1 is a block diagram used to describe the first embodiment of the present invention.

The preferred embodiments of the present invention are described below with reference to the accompanying figures.
First Embodiment FIG. 1 is a block diagram used to describe significant aspects of first embodiment of the present invention. Overall, this embodiment comprises, as shown in FIG. 1, image memory 2 for storing the input image data preferably contained in system memory 220 (not shown, See FIG. 15); feature unit searching range setting units 3 for setting the searching ranges for the facial features to be extracted (i.e., the right and left eyes, eyebrows, mouth, and facial contours in this embodiment based on the contents of image memory area 2 and memory segments 100a, 100b & 100c (not shown, see FIG. 15), each holding user defined or calculated center point values for the eyes and mouth for the digitized facial image contained in image memory area 2); feature unit extractor 4 for extracting the area of the respective feature units in the set searching ranges; contour point extractor 5 for extracting the representative contour points forming the feature unit contours from the extracted feature unit areas, and outputting the corresponding coordinate data to coordinate data memory area 110; and extracted content evaluator 6 for evaluating whether the extracted content is correct or not correct based on the coordinate data.

Figure 2:
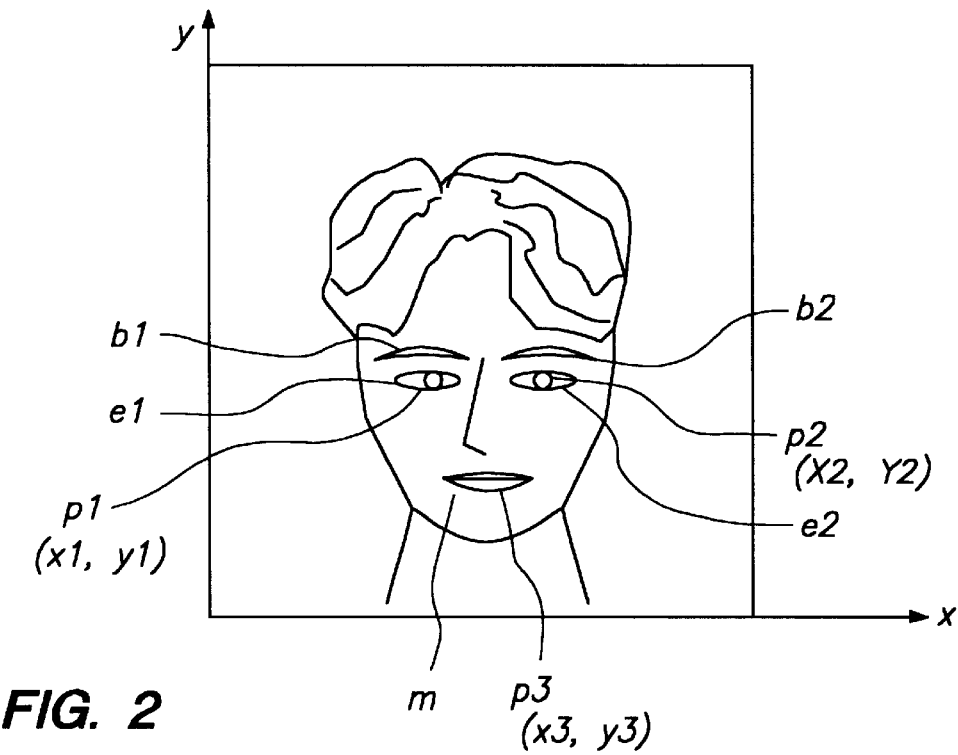
FIG. 2 graphically depicts an input facial image.
Figure 15:
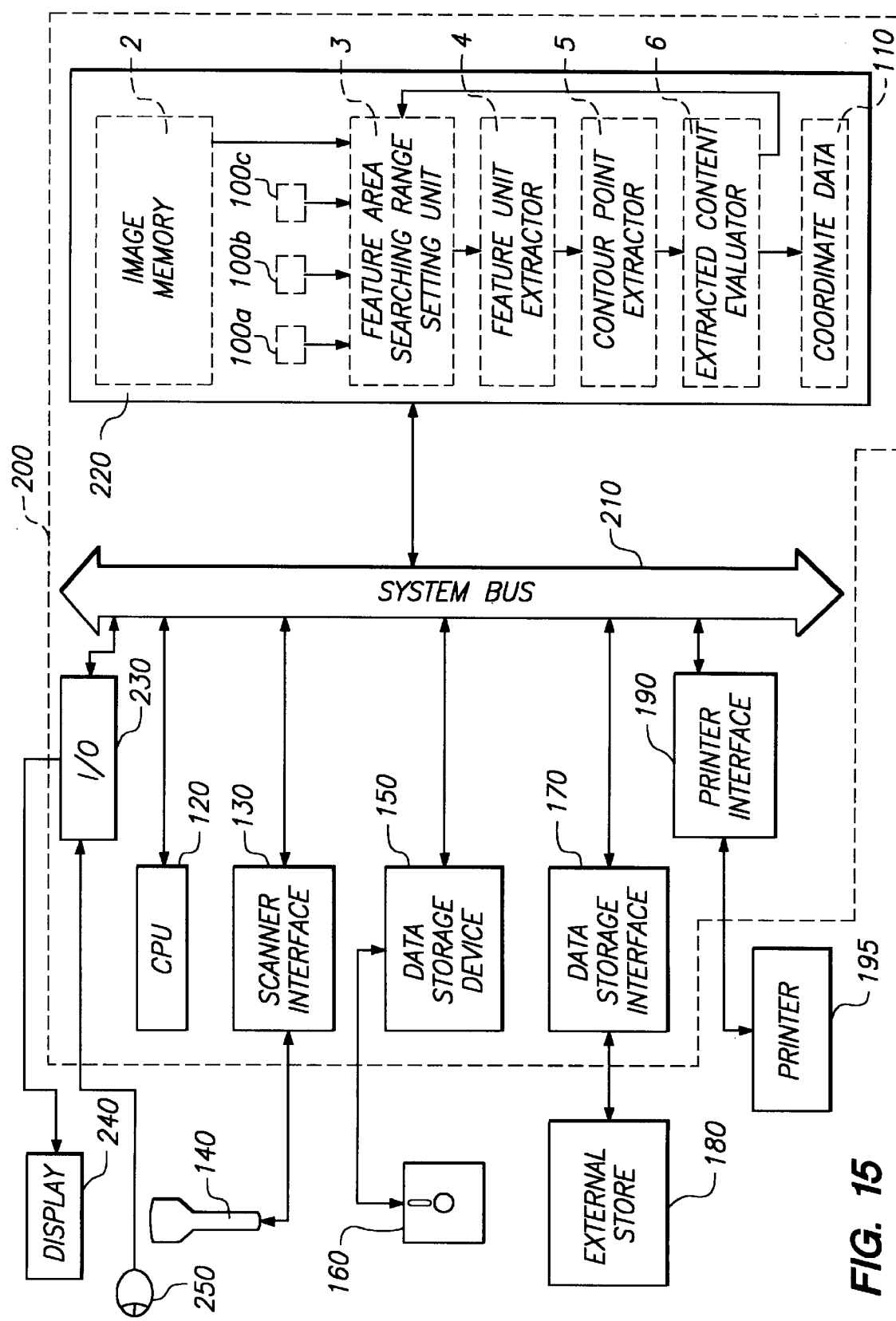
FIG. 15 is a representative processing system incorporating the teachings of the first embodiment of the invention.

According to the presently preferred embodiments, a multiple tone color facial image or similar feature-rich image is preferably scanned in through the use of image input member 140 (FIG. 15). A simplified, black and white example of such an image is shown in FIG. 2. The scanned image is then digitized into corresponding color grade image data at scanner interface 130, with the assistance of CPU 120 and system memory 220 of computer processing system 200. Then, the composite scanned digitized image is deposited into the image memory area 2 of system memory 220 in a known format. It should be recognized here that the subject facial image as depicted in FIG. 2 need not be necessarily originally digitized by the processing system of FIG. 15, and can instead be already accessible to processing system 200 through the external store 180, data storage device 150/ removable media 160, or system memory 220 itself.

Turning back to FIG. 1, feature area searching range setting unit 3 preferably comprises a searching range setting subunit for each of the feature units to be extracted, i.e., a mouth searching range setting unit 31, eyes searching range setting unit 32, eyebrows searching range setting unit 33, and facial contour searching range setting unit 34 for the mouth, right and left eyes, eyebrows, and facial contour features units extracted for this embodiment.

Feature unit extractor 4 similarly comprises corresponding mouth area extractor 41, eye area extractor 42, eyebrow area extractor 43, and facial contour extractor 44 for extracting the feature units within their respective searching ranges.

Contour point extractor 5 likewise comprises a mouth contour point extractor 51, eye contour point extractor 52, eyebrow contour point extractor 53, and facial contour point extractor 54 for extracting the representative contour points forming the contours of the corresponding areas based on the respective output from the feature unit area extractors 41–44, and extracting the coordinate data of the extracted contour points useful in blending, morphing, image identification or similar image processing applications in which three dimensional aspects and locations of images are evaluated and/or manipulated.

Also, extracted content evaluator 6 likewise comprises mouth extraction content evaluator 61, eye extraction content evaluator 62, eyebrow extraction content evaluator 63, and facial contour extraction content evaluator 64 for determining whether the content extracted by the contour point extractors 51–54 is correct.

It should be noted here that components of this invention may be conveniently implemented using a conventional general purpose digital computer programmed according to the teachings of the specification, as will be apparent to those skilled in the computer arts. Appropriate software coding can be readily prepared based on the teachings of the present disclosure, as will be apparent to those skilled in the software art. The present invention may also be implemented by preparation application specific integrated circuits (ASICs) or by interconnecting an appropriate network of conventional component devices and circuits, as will be readily apparent to those skilled in the art.

In each of the following preferred embodiments of the present invention, including but not limited to, the first embodiment as shown in FIG. 1, the feature area searching range setting unit 3, including specific feature searching range setting units 31–34; feature unit extractor 4, including specific feature area extractors 41–44; contour point extractor 5, including specific feature contour point subextractors 51–54; and extracted content evaluator 6, including specific facial feature extraction content subevalutors 61–64, will all take the form of interdependent threads executing on a general purpose processing system 200 (FIG. 15). These threads permit the processing system 200 to carry out the image development techniques and processes of the present invention when the processing system 200 reads and executes their corresponding programming instruction from a computer readable storage media. The storage medium containing the thread instructions can include, but is not limited to, any type of disk media including floppy disks, optical disks, CD-ROMS, magneto-optical disks, hard drives or disk arrays, whether located within or external to the processing system 200. Alternatively, the storage medium can include ROM, RAM, EPROM, EEPROM, FLASH EEPROM or any other type of storage medium suitable for at least temporary storage of computer readable instructions.

Turning now briefly to FIG. 15, FIG. 15 illustrates in more detail the representative processing system 200, which includes system memory 220, CPU 120 and scanner interface 130 interconnected via system bus 210 well known in the computer arts. Also connected to the system bus 210 is system addressable storage device 150 capable accepting, reading and writing information to and from a type of removable media 160 and external store 180 illustrating storage mediums in communication with processing system 200. Accordingly, in this processing system, programming instructions corresponding to the feature area searching area range setting unit or its respective subunits 31–34, feature unit extractor 4 including area extractor subunits 41–44; contour point extractor 5 including contour point extractor subunits 51–54; and extracted content evaluator 6 including extraction content evaluator subunits 61–64; all may partially or fully reside within external store 180, removable media 160 and/or system memory 220 as is well known in the art.

Moreover, image memory 2 and use defined feature point registers 100a, 100b and 100c may be constructed within system memory 220 as integral part thereof or may comprise discrete circuitry as well known in the computing arts.

Still referring to FIG. 15, removable media 160 may include a floppy disk, CD ROM, ROM cartridge or other similar apparatus for retaining information in computer readable form. Similarly, external store 180 may include another processing system, a computer readable storage component a collection or network of processing systems and/or storage components, or similar device or devices in communication with processing system 200 to exchange information including the above-mentioned read instructions. Further, in these embodiments, processing system 200 is indicated as being a general purpose digital computer. However, in ordinary skill with knowledge of this disclosure will understand that the particular processing system could alternatively include, for example, a special purpose dedicated micro-controlled subsystem or similar processing device as long as it has sufficient resources for at least sequential execution of the techniques described hereinbelow.

Also shown in FIG. 15 is printer 195 communicating with system bus 210 and CPU 120 through printer interface 190. In this embodiment, printer 195 may be used as a hard copy output device for coordinate data and feature extraction information developed by the interdependent threads 3 through 6 and the results and coordinate data information 110 contained within system memory 220. Likewise, display 240 is used to impart graphical images including a likeness of the subject facial images shown in FIG. 2 to an end user of processing system 200. As shown in processing system 200, CPU 120 directs image data to be displayed on display 240 by communicating over system bus 210 to I/O interface 230 which translates the image data signals into appropriate CRT RGB values for imparting a two dimensional rendition of image to the end user. A mouse 250 is also shown connected to I/0 interface 230 of computer system 200 for receiving user input based in part in reaction to image information presented to the user on display 240. Alternatively, as is well known in the art, other input devices may be used to capture user input including but not limited to voice processing equipment, a keyboard, a touch pad, etc.

It should also be noted here that the points specified for the three feature units processed, i.e. the mouth and the right and left eyes (ideally, the center point of the mouth and the center points of the right and left eyes) are selected by the user in the present embodiment, and the searching ranges for the mouth, eyes, and eyebrows are set based on the coordinates of these user-specified points. This is described below.

For example, the user may use the mouse 250 to specify the center points p1 and p2 of the two eyes e1 and e2, and the center point p3 of mouth m in a facial image as shown in FIG. 2 and on the display 240. It is assumed below that the relative (x, y) Cartesian coordinates of these three designated points p1, p2, and p3 are, respectively, (x1, y1), (x2, y2), and (x3, y3).

The center points having been specified, mouth searching range setting unit 31 executes the following process.

Figure 3:
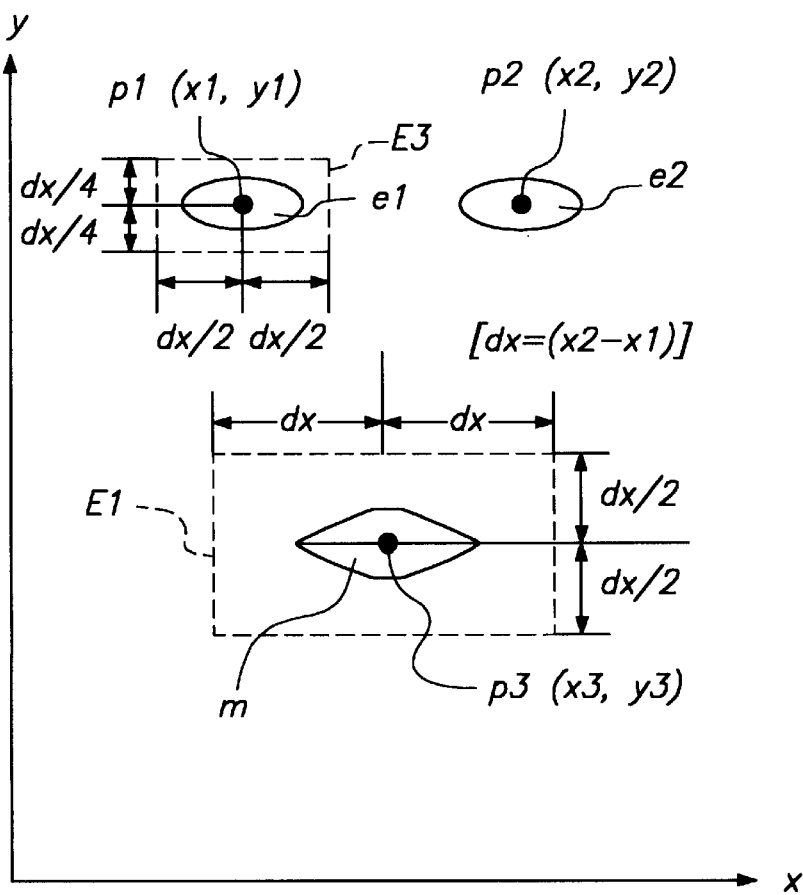
FIG. 3 is used to describe setting the mouth and eye searching ranges according to the first embodiment of the invention.
Figure 16:
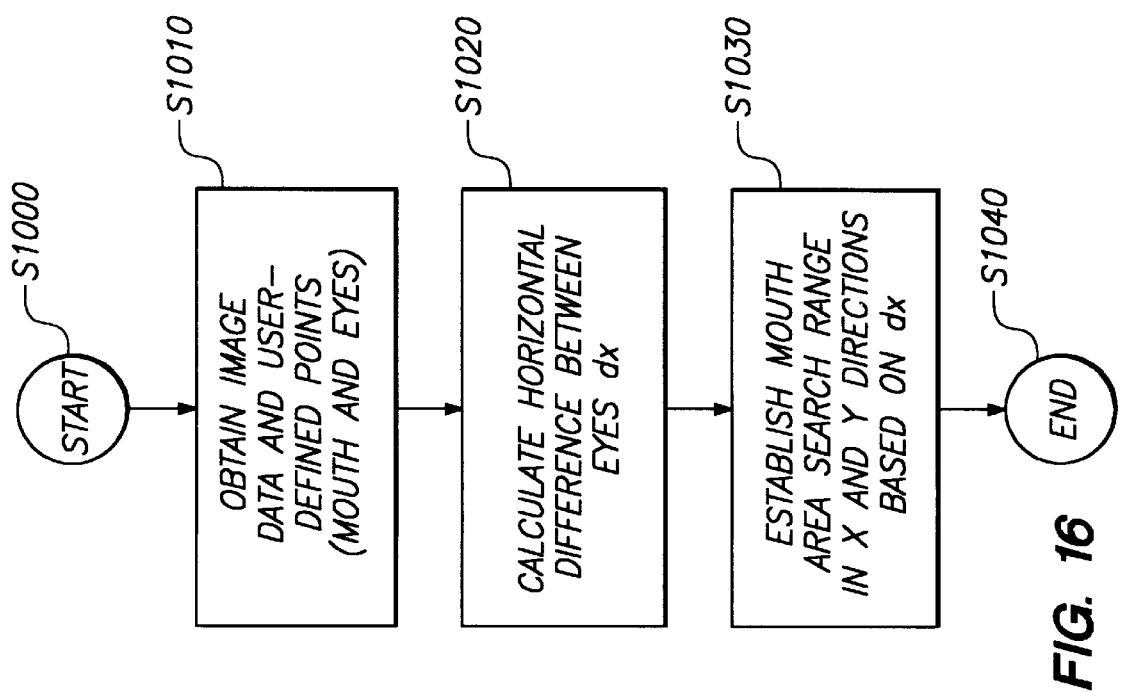
FIG. 16 is a flowchart illustrating mouth area range setting according to the first embodiment as described with reference to FIG. 3.

Control begins at step S1000 as shown in FIG. 16. Control thereafter passes the step S1010, in which the mouth searching range setting unit 31 queries the image data and user defined points for the mouth and eyes chosen by the user. Control passes to step S1020 in which the mouth searching range setting unit obtain the difference dx between the x coordinates of the centers points p1 and p2 left and right eyes e1 and e2 respectively (dx=x2−x1) to define the mouth searching range in the x axis direction based on the center point of the mouth (user defined point p3), as shown in FIG. 3. Thereafter, control passes to step S1030, in which the mouth area search range in the x and y directions is established. More particularly, in this embodiment, one-half of dx $$\left(\text{i.e., } \frac{dx}{2}\right)$$

is obtained to define the mouth searching range in the y-axis direction, and is based on the user-defined center point p3 of the mouth. Controlled and terminates normally in step S1040. The resulting search range E1 (the area enclosed by the dotted line in FIG. 3) from (x3−dx) to (x3+dx) in the x-axis direction, and $$\left(y3 - \frac{dx}{2}\right) \text{ to } \left(y3 + \frac{dx}{2}\right)$$

in the y-axis direction, is thus defined as the searching range for mouth m.

Figure 4:
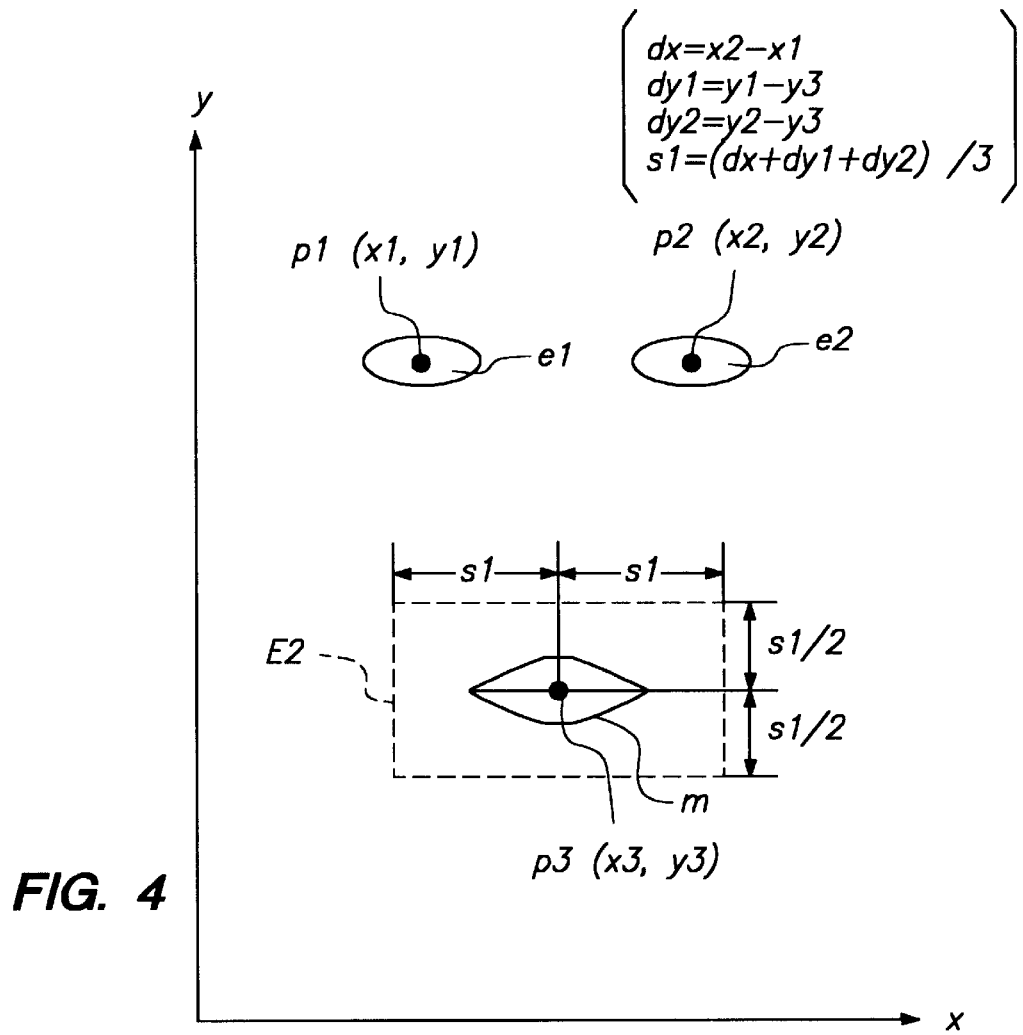
FIG. 4 is used to describe an alternative technique for setting the mouth searching range according to the first embodiment of the invention.
Figure 17:
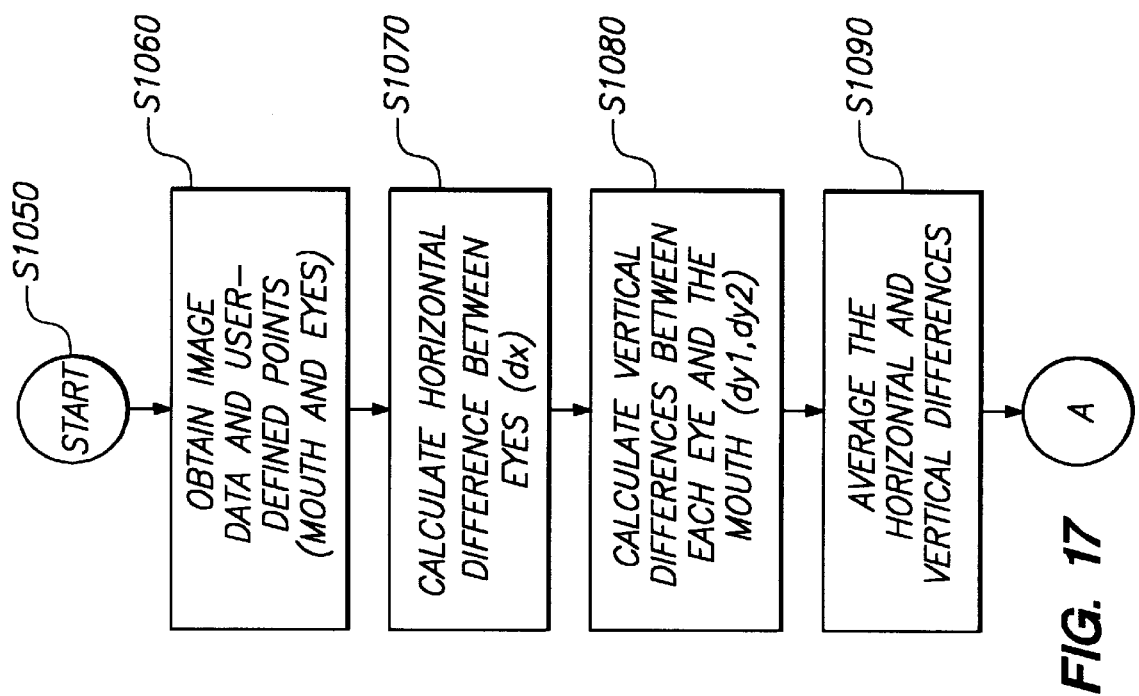
FIGS. 17 and 18 are flowcharts depicting mouth area range setting according to the first embodiment as described with reference to FIG. 4.
Figure 18:
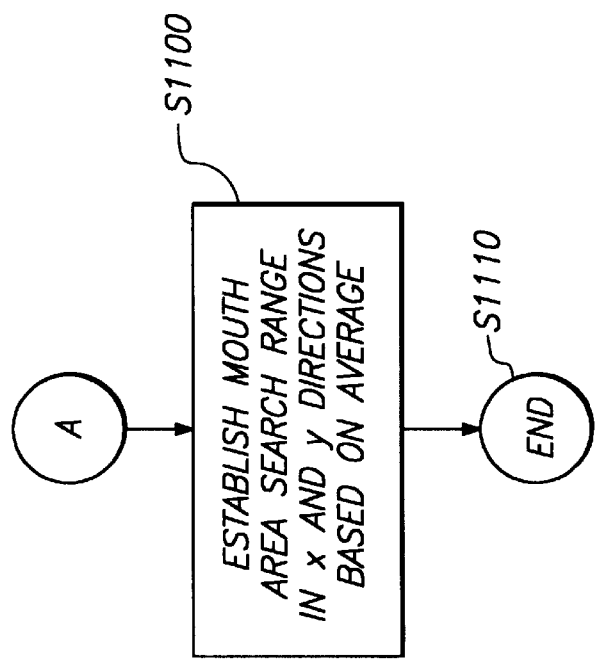

An alternative method of obtaining the mouth m searching range is shown in FIG. 4. Now referencing the flow chart of FIGS. 17 and 18, control within the mouth searching range setting unit 31 begin at step S1050. Control thereafter passes to step S1060 in which the image data and user defined point for the mouth and eyes are acquired. Control thereafter passes to step S1070 in which mouth searching range setting unit 31 obtains the difference dx between the x coordinates of center points p1 and p2 of left and right eyes e1 and e2 (dx=x2−x1), the difference dy1 between the y coordinate (=y1) of the left eye e1 and the y coordinate (=y3) of the mouth (dy1=y1−y3) and the difference dy2 between the y coordinate (=y2) of the right eye e2 and the y coordinate (=y3) of the mouth (dy2=y2−y3), at step S1080. Control thereafter pass to step S1090, where the average S1 of these difference values $$\left(s1 = \frac{(dx + dy1 + dy2)}{3}\right)$$

is calculated to define the mouth searching range in the x-axis direction based on the user-defined center point p3 of the mouth, as shown in FIG. 4. One-half of this average s1 is then obtained $$\left(\text{i.e., } \frac{s1}{2}\right)$$

to define the mouth searching range in the y-axis direction, also based on the user-defined center point p3 of the mouth S1100 (FIG. 18.). The resulting range E2 (the area enclosed by the dotted line in FIG. 4) from (x3−s1) to (x3+s1) in the x-axis direction, and $$\left(y3 - \frac{s1}{2}\right) \text{ to } \left(y3 + \frac{s1}{2}\right)$$

in the y-axis direction, is thus defined as the searching range for mouth m. Control then terminates naturally at step S1110.

Figure 19:
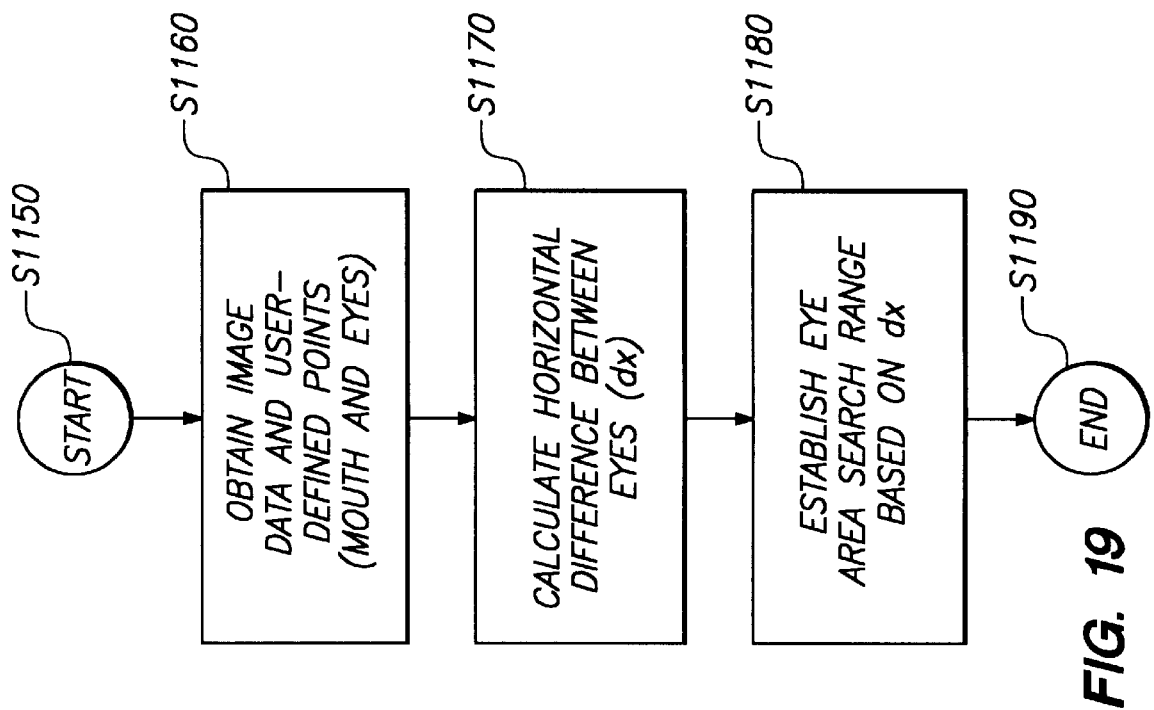
FIG. 19 is a flowchart depicting eye area range setting according to the first embodiment as described with reference to FIG. 3.

Meanwhile, eyes searching range setting unit 32 then determines the searching ranges for the eyes e1 and e2. The method applied here is the same for both eyes, so the following description is therefore limited to left eye e1. Referring again to FIG. 3 and now the flow chart of FIG. 19, control with the eye searching range setting unit 32 begins at step S1150. Control thereafter passes to step S1160 in which the image data and the image defined points for the mouth and eyes are acquired as described hereinabove. Thereafter, at step S1170, the horizontal difference between the eyes is calculated as discussed hereinabove with reference to the mouth searching range setting unit 31. Next, at step S1180, half of the eye x-coordinate difference dx (=x2−x1), i.e., $$\frac{dx}{2},$$

is obtained to define the eye searching range in the x-axis direction based on the user-defined center point p1 of left eye e1. One-fourth of the eye x-coordinate difference dx, i.e., $$\frac{dx}{4} \left( = \frac{x2 - x1}{4} \right),$$

is obtained to define the eye searching range in the y-axis direction based on the user-defined center point p1. The resulting range E3 (the area enclosed by the dotted line in FIG. 3) from $$\left(x1 - \frac{dx}{2}\right) \text{ to } \left(x1 + \frac{dx}{2}\right)$$

in the x-axis direction, and $$\left(y1 - \frac{dx}{4}\right) \text{ to } \left(y1 + \frac{dx}{4}\right)$$

in the y-axis direction, is thus defined as the searching range for left eye e1. Processing thereafter terminates naturally at step S1190. The searching range for right eye e2 is similarly defined, based on user-defined center point p2.

Also, preferably concurrently, eyebrows searching range setting unit 33 determines the searching ranges for left and right eyebrows b1 and b2. The method applied here is the same for both eyebrows, so the following description is therefore limited to left eyebrow b1. It should be noted here that the eyebrow searching ranges are defined based on the user-defined center points for the eyes in the present embodiment, because there are no user-defined center points specifically for the eyebrows.

Figure 5:
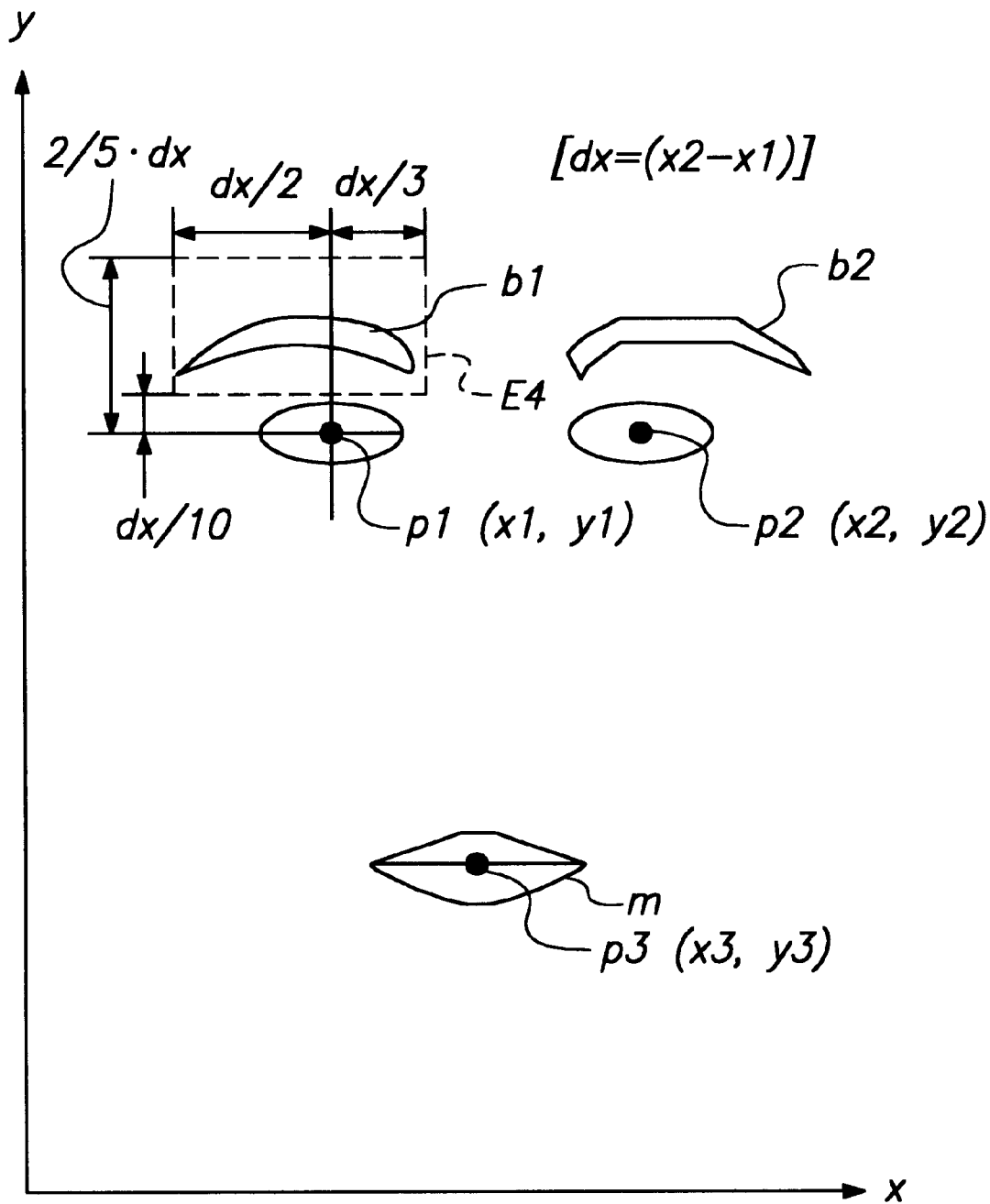
FIG. 5 is used to describe setting the eyebrow searching range according to the first embodiment of the invention.

Referring to FIG. 5, the x-axis limits of the eyebrow searching range are defined as $$\frac{dx}{3}$$

from center point p1 to the nose-side of the eye center, and $$\frac{dx}{2}$$

from center point p1 to the outside of the eye center (where x-coordinate difference dx of the left and right eyes e1, e2 is x2−x1 as defined above) based on the user-defined center point p1 for the left eye. The y-axis limits of the eyebrow searching range are defined as $$\frac{2dx}{5} \text{ to } \frac{dx}{10}$$

above the user-defined left-eye center point p1, resulting in searching range E4 for left eyebrow b1 as also shown in FIG. 5. The searching range for right eyebrow b2 is similarly defined, based on user-defined center point p2.

Once the user defines the center points for the left and right eyes and mouth, facial image processing according to the present embodiment is thus able to define the searching ranges for the mouth, eyes, and eyebrows based on those user-defined points. The method for extracting the areas of the mouth, eyes, and eyebrows within the defined searching ranges according to the first embodiment is described below.

To extract the area of the mouth once the searching range for the mouth has been set by mouth searching range setting unit 31, mouth area extractor 41 follows a particular program confined to the defined searching range. For example, each pixel within the searching range may be scanned using a raster scan technique, and the YIQ color system Q component of each pixel is compared with a predetermined threshold value to detect those pixels in which the Q component exceeds the threshold value. If the pixels in which the Q component exceeds the threshold value are concentrated in a single region, and the area of this region is at least equal to a known area (to eliminate scanning noise and slight facial variations), that region is determined to be the mouth (or more specifically, the lips). Note that if there are plural regions within the searching range in which the Q component exceeds the threshold value, the region having the greatest area is determined to be the region of the mouth (lips) according to this embodiment.

Figure 6:
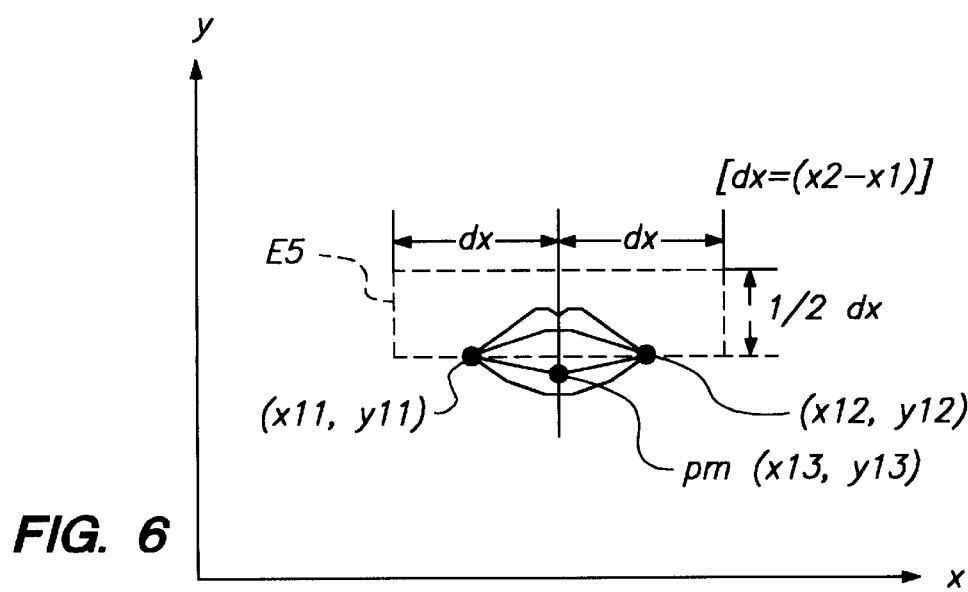
FIG. 6 is used to describe setting the mouth searching range according to the first embodiment of the invention when the mouth is open.
Figure 20:
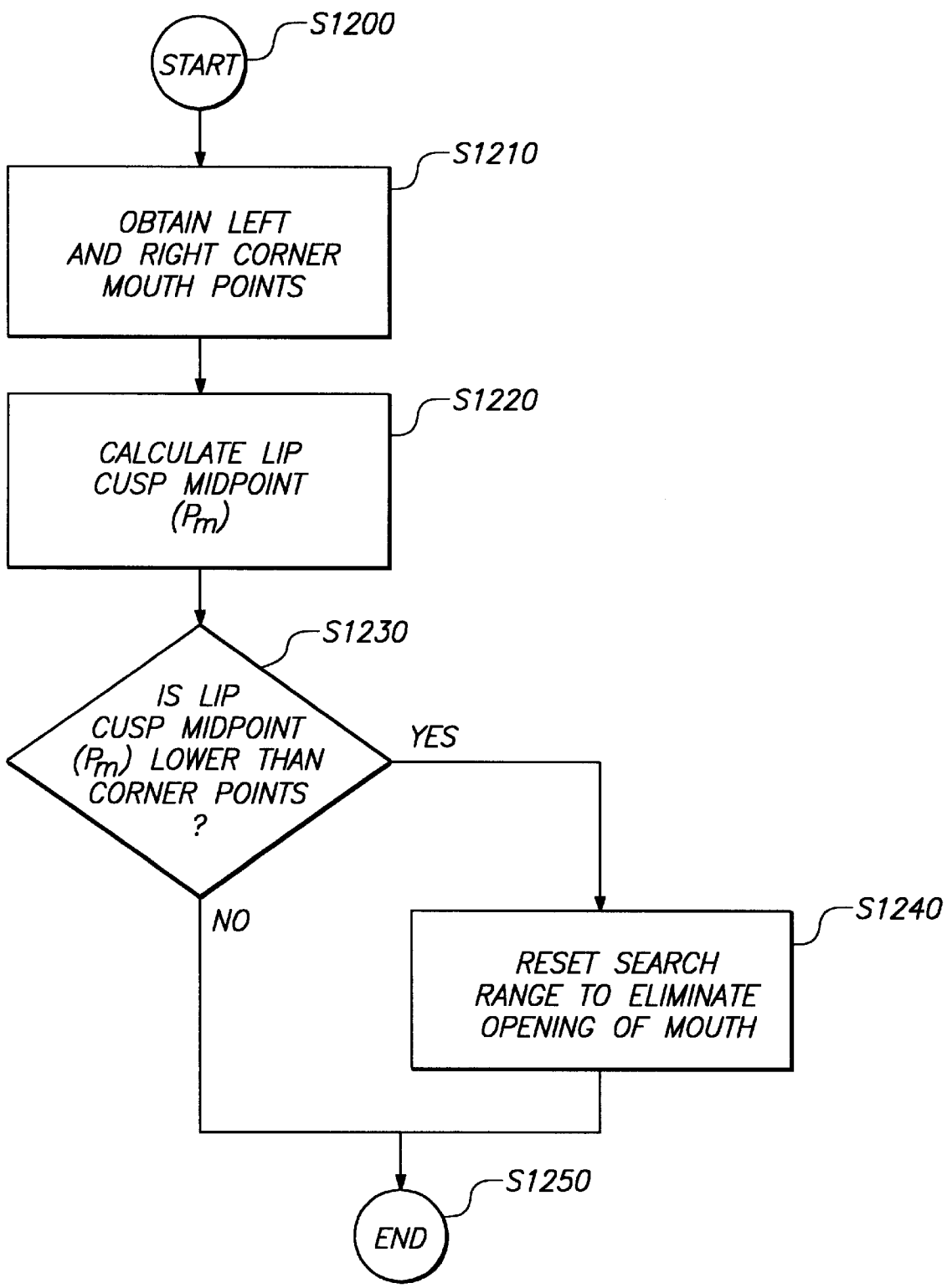
FIG. 20 is a flowchart illustrating mouth extraction verification according to the first embodiment as described with reference to FIG. 6.

When the mouth is open and the upper and lower lips are separated, such as when the subject in the image is smiling, the area of the lower lip is typically greater than the area of the upper lip, and may be erroneously defined as the entire mouth area as shown in FIG. 6. To prevent this, mouth extraction content evaluator 61 executes the following procedure as detailed in the flowchart of FIG. 20.

Controls begins at step S1200, and then progresses to step 1210 in which the left and right corner mouth points as extracted by mouth contour point extractor 51 are (x11, y11) and (x12, y12) as shown in FIG. 6. Then, at step S1220, the coordinates (x13, y13) of the top edge point or lip cusp $p_m$ of the region extracted as the mouth are obtained at the midpoint between the left and right end points (x11, y11) and (x12, y12). The relationship between the position of this top edge midpoint y-coordinate y13 and the y-coordinates y11 and y12 of the left and right end points (the vertical relationship between these three points) is then investigated in step S1230. If the midpoint $p_m$ y-coordinate y13 is less than the left and right end point y-coordinates y11 and y12 (i.e. y11>y13 and y12>y13), it is determined that the extracted mouth area represents an open mouth, and the area extracted as the mouth area represents only the lower lip area.

In this case, control passes to step S1240, in which the searching range is reset referenced to the left and right end point coordinates (x11, y11) and (x12, y12). This re-searching range is the searching range E5 shown by the dotted line in FIG. 6. The size of searching range E5 may be, for example, an area equal to half the y-axis height of the complete mouth searching range E1 shown in FIG. 3, i.e., an area 2dx long on the x-axis and $$\frac{dx}{2}$$

high on the y-axis, but shall not be so limited. as will become apparent to those ordinarily skilled in the art. The re-searching region may also be optimally defined. Control thereafter terminates naturally at step S1250.

Of course, if it is determined in step S1230 that the lip cusp mid point is not lower than the corner points of the mouth, control instead naturally terminates at step 1250 without a need to reset the mouth search range.

The complete mouth area can thus be reliably extracted even in images in which the subject's mouth is open, and the facial image processing method of this embodiment can thus also be used with smiling or talking subjects.

The eye and eyebrow areas are extracted in the same way as the mouth area by eye area extractor 42 and eyebrow area extractor 43 according to a particular program confined to the defined searching ranges. For example, each pixel within the searching range is scanned using a raster scan technique, and the YIQ color system I component of each pixel is compared with a predetermined threshold value to detect those pixels for which the I component exceeds the threshold value. If the pixels for which the I component exceeds the threshold value are concentrated in a single area, and the area of this area is at least equal to a known size, that area is determined to be the eyes (eyebrows). Note that if there are plural regions within the searching range in which the I component exceeds the threshold value, the region having the greatest area is determined to be the area of the eyes (eyebrows).

Because the searching ranges corresponding to the left and right eyes, mouth, and eyebrows are set based on the coordinates of the three points defined by the user as the centers of the left and right eyes and mouth, and identification of facial features can therefore be restricted to those user-defined areas, the process executed to extract those features can be greatly simplified, and feature extraction can be more precise.

The process for setting the facial contour searching range by the facial contour searching range setting unit 34 for facial contour extraction is described next, using, by way of example, the process for setting the facial contour searching range for extracting the facial contour in the area at the height of eyes e1 and e2. The process described below extracts the facial contour in the area on a line extended horizontally (in the x-axis direction) from the user-defined center points of the left and right eyes. Note that because the same process is symmetrically applied for the left and right eyes, the description below is limited to that for setting the searching range for extracting contour point p1 corresponding to left eye e1.

Figure 7:
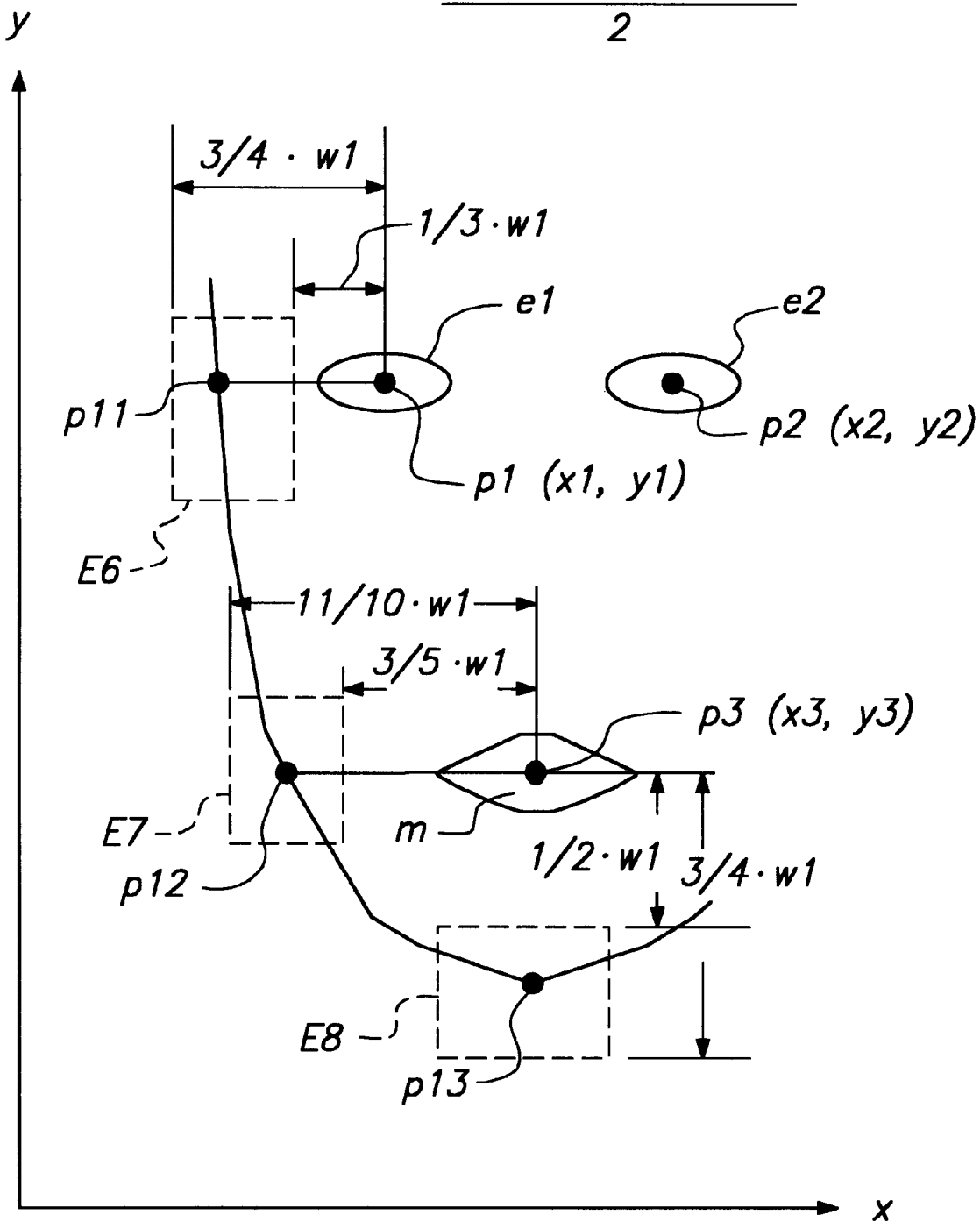
FIG. 7 is used to describe setting the facial contour searching range according to the first embodiment of the invention.

As previously described, the center coordinates of left and right eyes e1, e2 are (x1, y1) and (x2, y2), respectively, and the center coordinates of mouth m are (x3, y3). A searching range E6 including the contour point p1 is then first set as shown in FIG. 7 based on these coordinates. The limits of range E6 in the x-axis direction are set on a horizontal line passing through center point p1 of the left eye and contour point p11 (the coordinates of which are still unknown). Note that the y-axis dimension of the range is not specifically defined, and an appropriate range is therefore set on the y-axis relative to the horizontal line through point p1.

Specifically, referring to the flowchart of FIG. 21, control passes to step S1300 and S1310, in which the image and user defined points are acquired in a manner discussed hereinabove. Then control passes to step S1320, in which the average of the y-axis coordinates of left and right eyes e1, e2 and mouth m $$\left( = w1 = \frac{(y1 - y3) + (y2 - y3)}{2} \right)$$

is calculated. Control then passes to step S1330, in part, where the average w1 is multiplied by three-fourths to obtain the distance $$\left( w1 \times \frac{3}{4} \right)$$

of the outside edge of searching range E6 from center point p1 of the left eye, and multiplied by one-third to obtain the distance $$\left( w1 \times \frac{1}{3} \right)$$

of the inside edge of searching range E6 from center point p1 of the left eye. The same process is symmetrically applied to obtain the x-axis limits of the searching range for the facial contour on the other side of the face. Control then naturally terminates at step S1360.

Facial contour extractor 44 is then able to extract the facial contour within this range by applying an edge detection process, e.g., scanning the pixels in this range to extract those pixels there is a significant luminance difference. It is to be noted that an appropriate height limit is also defined for range E6 in the y-axis direction referenced to the horizontal line through contour point p1 as shown in FIG. 7. This is to obtain the average contour line when irregularities are created in the contour line due to noise or other factors in the edge detection process.

A similar process is executed preferably in parallel to set the facial contour searching range for extracting the facial contour in the area at the height of the mouth as described below. In this case contour point p12 on a line extended horizontally (in the x-axis direction) from the mouth m center (user-defined point p3) is extracted.

As described above, searching range E7 including the contour point p12 is set as shown in FIG. 7 based on the previously obtained center coordinates of left and right eyes e1, e2, (x1, y1) and (x2, y2), respectively, and mouth m, (x3, y3). The limits of range E7 in the x-axis direction are set on a horizontal line passing through center point p3 of the mouth and contour point p12. Note that the y-axis dimension of the range is not specifically defined, and an appropriate range is therefore set on the y-axis relative to the horizontal line through points p3 and p12.

Figure 21:
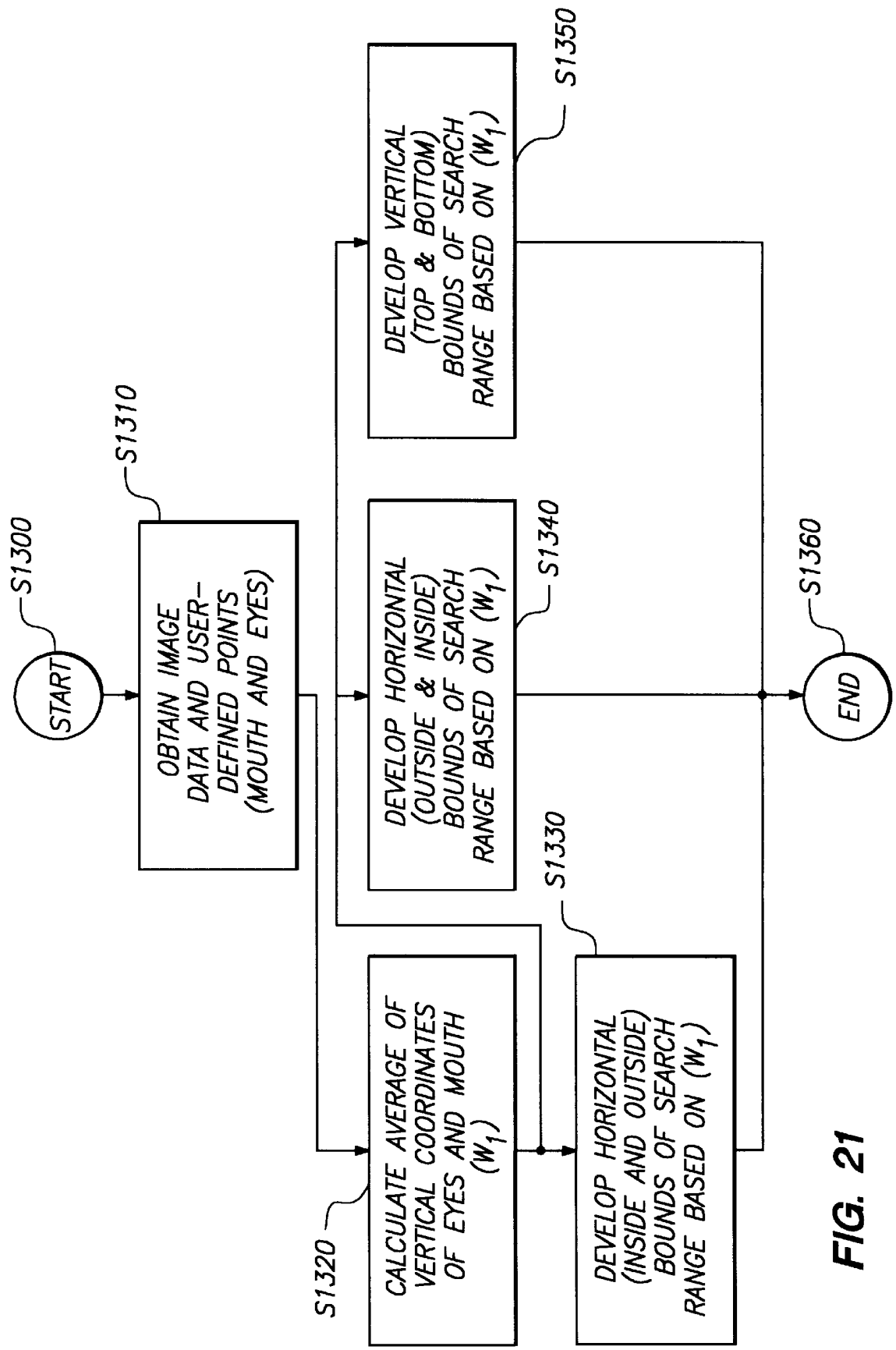
FIG. 21 is a flowchart illustrating facial contour area range setting according to the first embodiment as described with reference to FIG. 7.

Specifically referring to FIG. 21 the average of the y-axis coordinates of left and right eyes e1, e2 and mouth m $$\left( = w1 = \frac{(y1 - y3) + (y2 - y3)}{2} \right)$$

is obtained, as shown in step S1320. Then, in step S1340, the average w1 is multiplied by eleven-tenths ($^{11}/_{10}$) to obtain the distance $$\left( w1 \times \frac{11}{10} \right)$$

of the outside edge of searching range E7 from center point p3 of the mouth, and multiplied by three-fifths to obtain the distance $$\left( w1 \times \frac{3}{5} \right)$$

of the inside edge of searching range E7 from center point p3 of the mouth. Again, the same process is symmetrically applied to obtain the x-axis limits of the searching range for the facial contour on the other side of the face.

Facial contour extractor 44 is then able to extract the facial contour within this range by applying an edge detection process, e.g., scanning the pixels in this range to extract those pixels at which there is a significant luminance difference. It is to be noted that an appropriate height limit is also defined for range E7 in the y-axis direction referenced to the horizontal line through contour point p12 as shown in FIG. 7. This is to obtain the average contour line when irregularities are created in the contour line due to noise or other factors in the edge detection process.

A similar process is next executed to set the facial contour searching range for extracting the facial contour in the area of the chin as described below. In this case contour point p13 on a line extended vertically (in the y-axis direction) from the mouth m center (user-defined point p3) is extracted.

As described above, searching range E8 including the contour point p13 is set as shown in FIG. 7 based on the previously obtained center coordinates of left and right eyes e1, e2, (x1, y1) and (x2, y2), respectively, and mouth m, (x3, y3). The limits of range E8 in the y-axis direction are set on a vertical line passing through center point p3 of the mouth and contour point p13. Note that the x-axis dimension of the range is not specifically defined, and an appropriate range is therefore set on the x-axis relative to the vertical line through point p13.

Specifically still referring to the flow chart of FIG. 21, the average of the y-axis coordinates of left and right eyes e1, e2 and mouth m $$\left( = w1 = \frac{(y1 - y3) + (y2 - y3)}{2} \right)$$

is obtained as shown in step S1320. Thereafter, in this case control branches to step S1350, in which the average w1 is multiplied by three-fourths to obtain the distance $$\left( w1 \times \frac{3}{4} \right)$$

of the outside (bottom) edge of searching range E8 from center point p3 of the mouth, and multiplied by one-half to obtain the distance $$\left(wl \times \frac{1}{2}\right)$$

of the inside (top) edge of searching range E8 from center point p3 of the mouth.

Facial contour extractor 44 is then able to extract the facial contour within this range by applying an edge detection process, e.g., scanning the pixels in this range to extract those pixels at which there is a significant luminance difference. It is to be noted that an appropriate horizontal limit is also defined for range E8 in the y-axis direction referenced to the vertical line through contour point p13 as shown in FIG. 7. This is to obtain the average contour line when irregularities are created in the contour line due to noise or other factors in the edge detection process.

By thus separately defining searching ranges for and extracting the mouth, eyes, eyebrows, and parts of the facial contour, the coordinate data for the contour points representative of the corresponding facial features can be extracted by mouth contour point extractor 51, eye contour point extractor 52, eyebrow contour point extractor 53, and facial contour point extractor 54. The extracted contours are then verified by the corresponding mouth extraction content evaluator 61, eye extraction content evaluator 62, eyebrow extraction content evaluator 63, and facial contour extraction content evaluator 64. If no errors are detected in the extracted contents, the coordinate data for the contour points extracted by the contour point extractors 51~54 is output.

The verification process executed by the extraction content evaluators 61~64 determines whether the areas extracted by the mouth, eyes, eyebrows, and facial contour extraction processes are appropriate. An example of these processes for determining whether the eyes and mouth were correctly extracted is described below.

Whether the defined searching ranges are usable (valid) can be determined by determining whether the computed ranges contain the corresponding user-defined points. For example, if the user-defined point for extracting an eye is not the eye center but a point closer to the eyebrow, the set searching range may contain the eyebrow. As a result, pixel scanning may result in the eyebrow being falsely extracted. If the eyebrow is wrongly extracted when the eye should be extracted as in this example, it is possible to determine whether the extracted object is correct by checking whether the point defined by the user as the eye center is contained within the area of the eyebrow. Because it is the eye and eyebrow that are checked in this case, the evaluation is based on the relationship between the y-axis coordinates of the eye and eyebrow, specifically by determining whether the user-defined y-coordinate of the eye is within the maximum and minimum y-axis coordinates of the extracted area. If the user-defined point is within the extracted area, the extracted area is correct; if not, the extracted area is wrong. If the extracted area is determined to be wrong, a request to repeat the process is output.

In the case of the mouth, it is both determined whether only the lower lip was extracted, as described above, and whether the user-defined point (mouth center) is within the extracted area. The specific process executed is substantially identical to that used to verify the eyes as described above.

In the case of the eyebrows, however, there is no user-defined eyebrow center point (coordinates), and it is therefore not possible to verify the extracted eyebrow area by checking whether a user-defined point is contained therein. The eyebrow areas are therefore verified referenced to the corresponding user-defined eye centers, specifically by comparing the user-defined eye coordinates with the coordinates of the area extracted as the eyebrow.

Figure 8A:
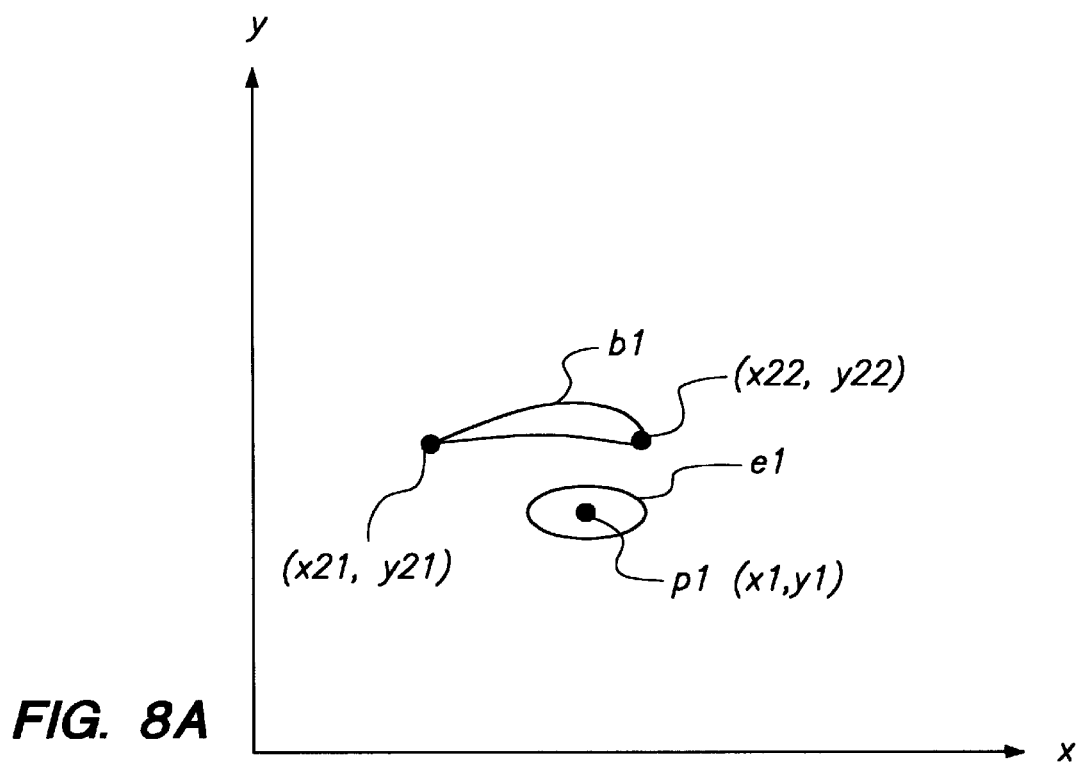
FIGS. 8A and 8B are used to describe an example of evaluating the extracted content according to the first embodiment of the invention.
Figure 8B:
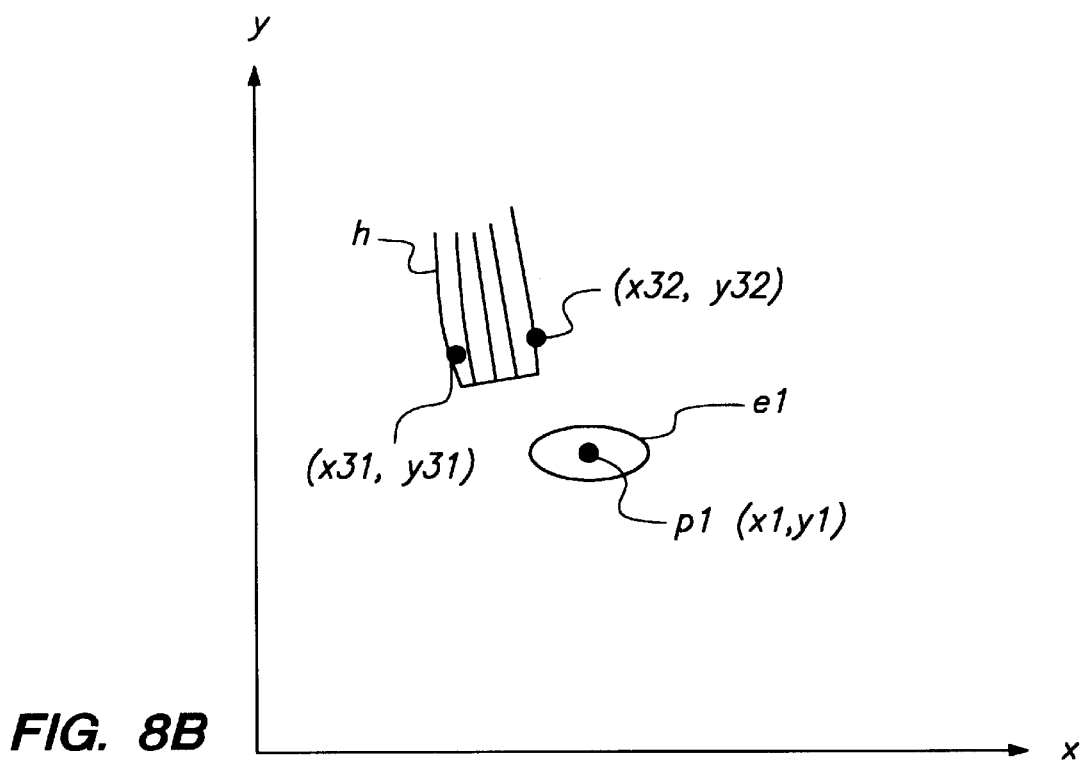
Figure 22:
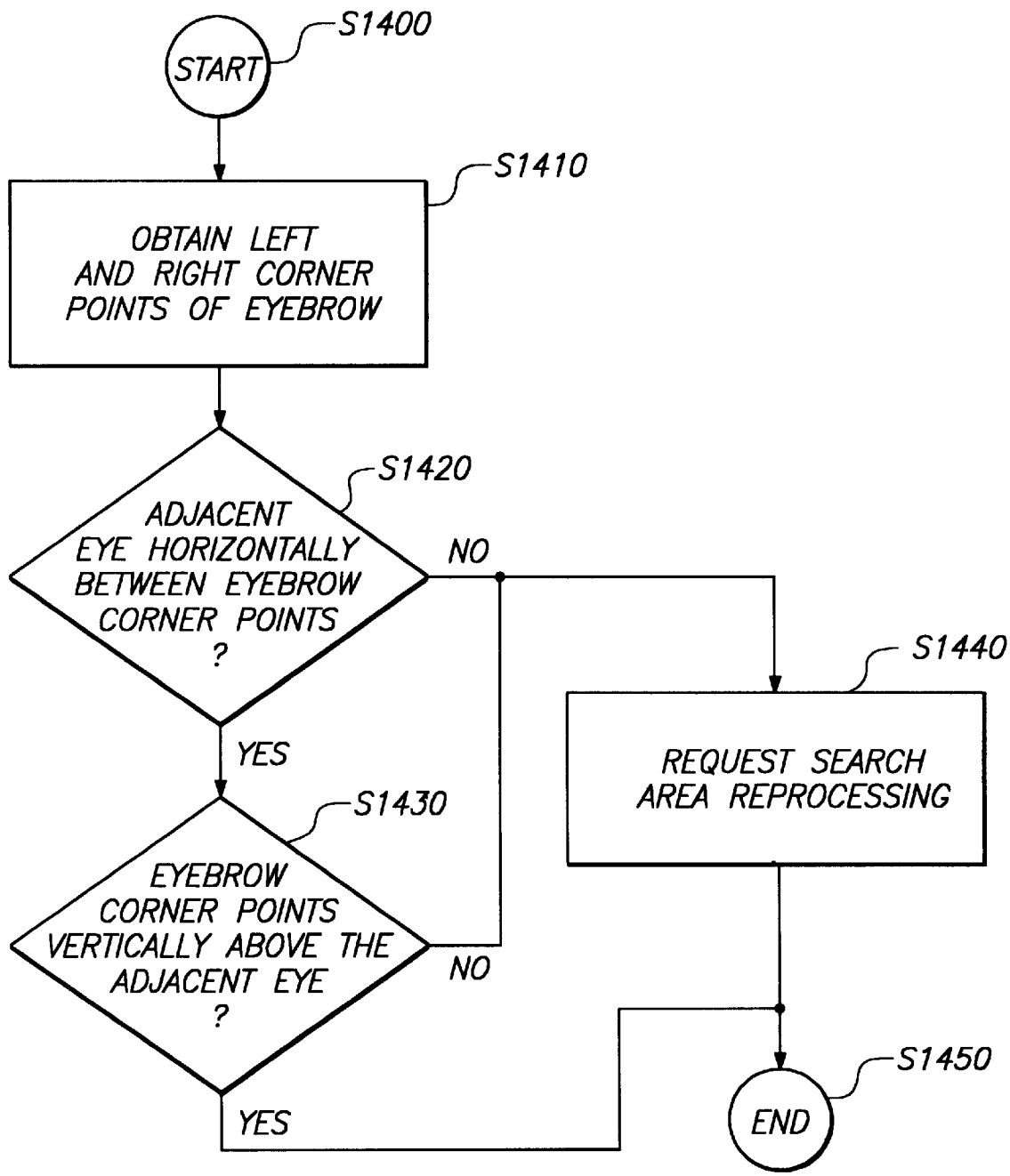
FIG. 22 is a flowchart illustrating eyebrow extraction verification according to the first embodiment as described with reference to FIGS. 8A and 8B.

This is described with reference to FIG. 8 in the flow chart of FIG. 22. As shown in FIG. 22 control begins at step S1400 and progresses to step S1410 in which the left and right corner points of the subject eyebrow contain within the image are acquired, e.g., (x21, y21) and x22, y22 respectively as shown in FIG. 8A. Next control passes to step S1420 in which determination is made where the eye adjacent to the subject eyebrows horizontally between the acquired eyebrow corner points. If so, control passes to step S1430. At step S1430, a determination is made whether the eyebrow corner points are vertically displaced above the adjacent eye. If so, control terminates naturally at step S1450, as the eyebrows have been correctly abstracted.

If however in step S1430 or in step S1420, either determination is made that the eyebrow corner points are misplaced with respect to the predefined subject eye point, control instead passes to step S1440. At step S1440, a request is made to reprocess the area as evidently the eyebrow corner point fall outside the acceptable range with respect to the predefined adjacent eye point. Control thereafter terminates naturally at step S1450. This evaluation criterion makes it possible to determine that area h (see FIG. 8B), resulting from hair hanging down at the left side of the face being extracted as the eyebrow area, is not a valid eyebrow area because the statement x31<x1<x32, where x31 and x32 are respectively the left and right side x-axis coordinates of area h, is not true.

It is to be noted that all of the coefficient values, e.g., ½, ⅖, and ⅒, used in the above embodiment for setting the various searching ranges are sample values only, and various other values may be alternatively used as will be appreciated by those ordinarily skilled in the art.

Second Embodiment

The first embodiment of the present invention was described above as a methodology for setting the searching ranges for the mouth, eyes, eyebrows, and other facial features, extracting those facial features within the set searching ranges, and then outputting the resulting coordinate data. A method for reliably extracting the coordinate data of the representative contour points of the eyes, mouth, and other facial feature contours without being affected by noise is described according to the second embodiment of the present invention hereinbelow. It is to be noted that extracting the areas of the eyes, mouth, and other feature contours shall not be limited to the first embodiment above whereby a searching range is first set and the facial features are then extracted within those areas.

Figure 9:
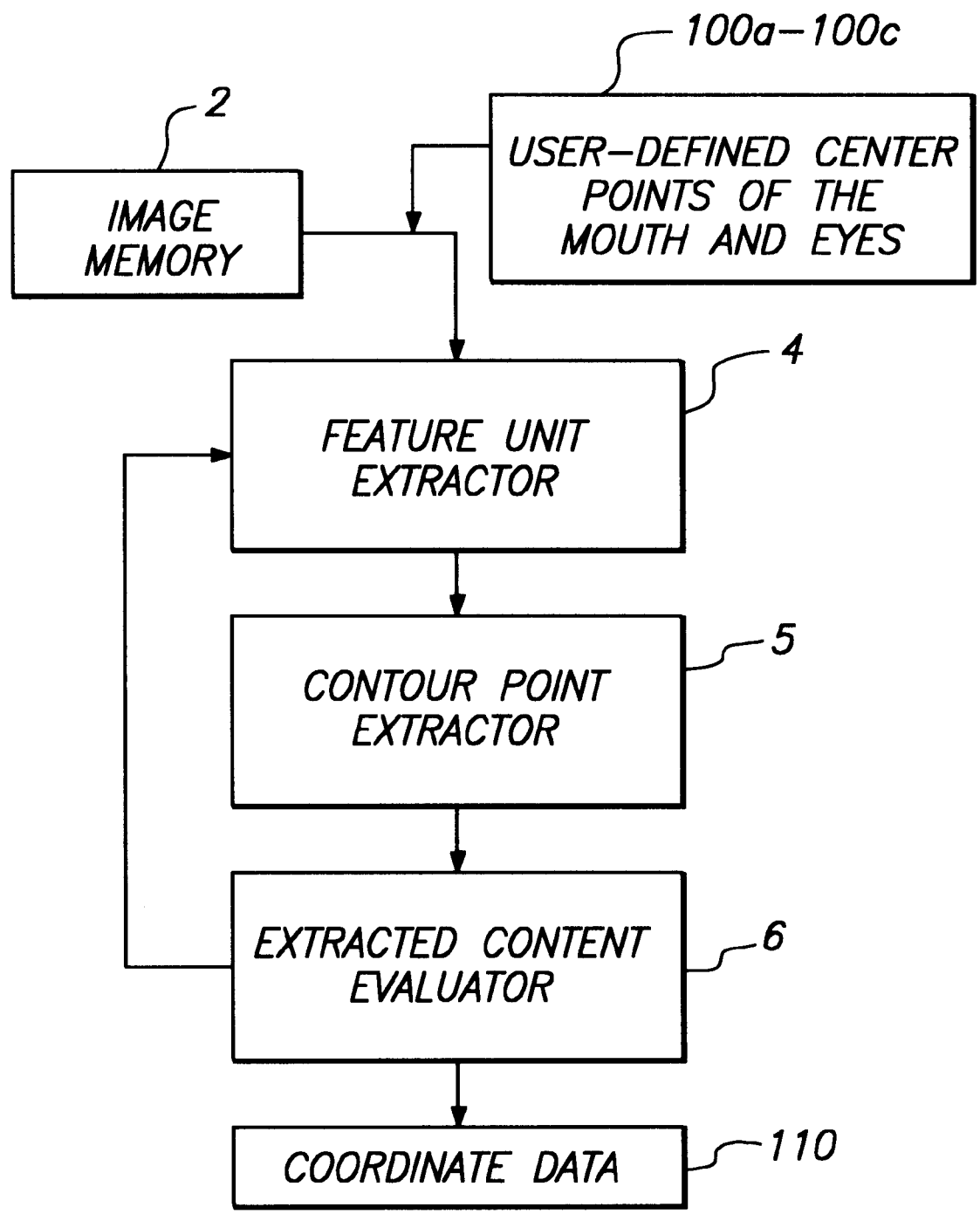
FIG. 9 is a simple block diagram used to describe the second embodiment of the present invention.

FIG. 9 is a block diagram used to describe this second embodiment. As shown in FIG. 9, this method comprises an image memory 2, feature unit extractor 4, contour point extractor 5, and extracted content evaluator 6. Feature unit extractor 4 of this embodiment is equivalent to the mouth area extractor 41, eye area extractor 42, eyebrow area extractor 43, or facial contour extractor 44 of the first embodiment, and may similarly be means for extracting feature units based on the image data within defined searching range, but shall not be so limited.

Contour point extractor 5 similarly corresponds to mouth contour point extractor 51, eye contour point extractor 52, eyebrow contour point extractor 53, or facial contour point extractor 54, and extracted content evaluator 6 to mouth extraction content evaluator 61, eye extraction content evaluator 62, eyebrow extraction content evaluator 63, or facial contour extraction content evaluator 64 of the first embodiment as shown in FIG. 1.

Figure 10:
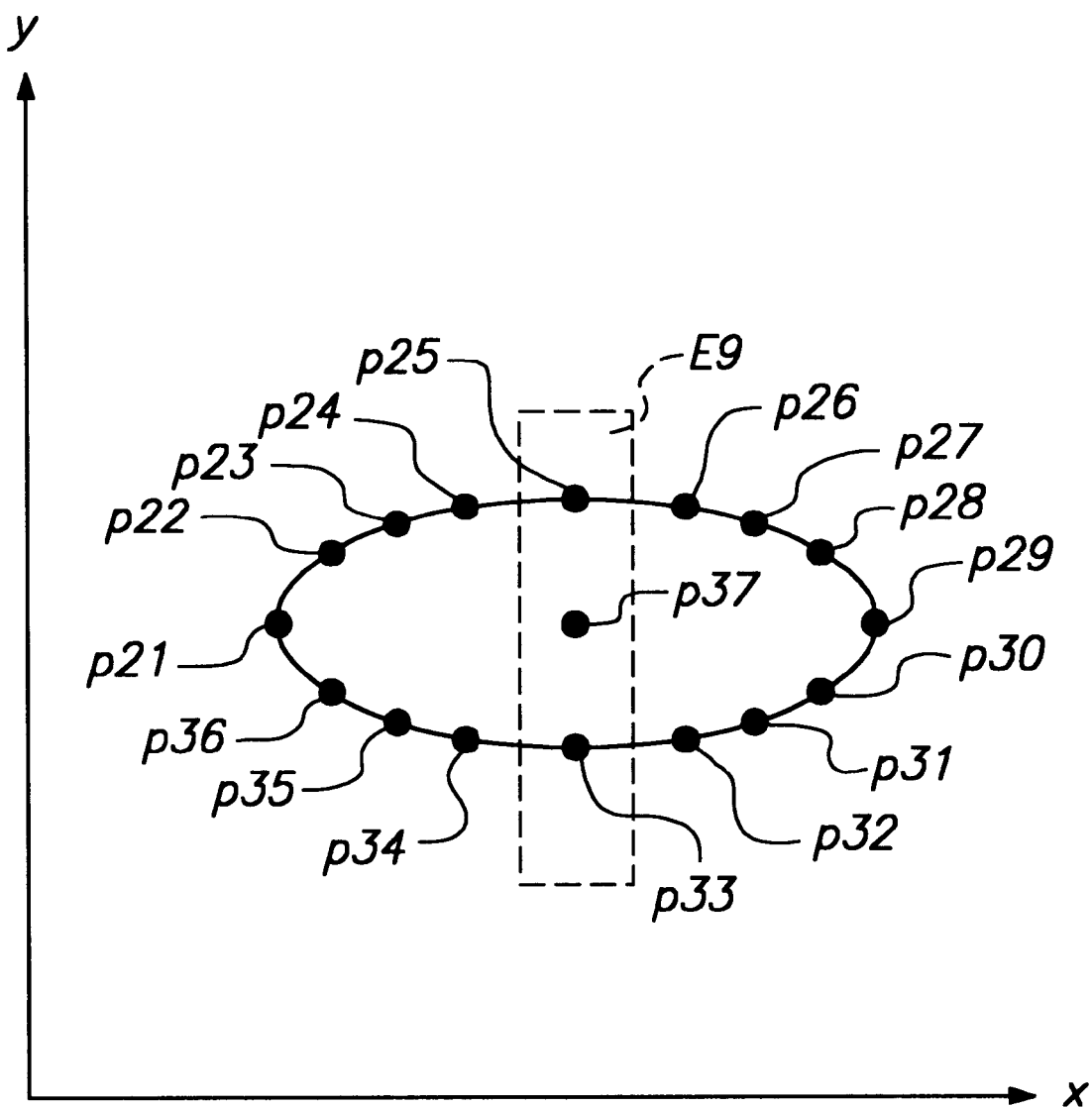
FIG. 10 is used to describe extracting the contour points forming the eye contour according to the second embodiment of the invention.
Figure 23:
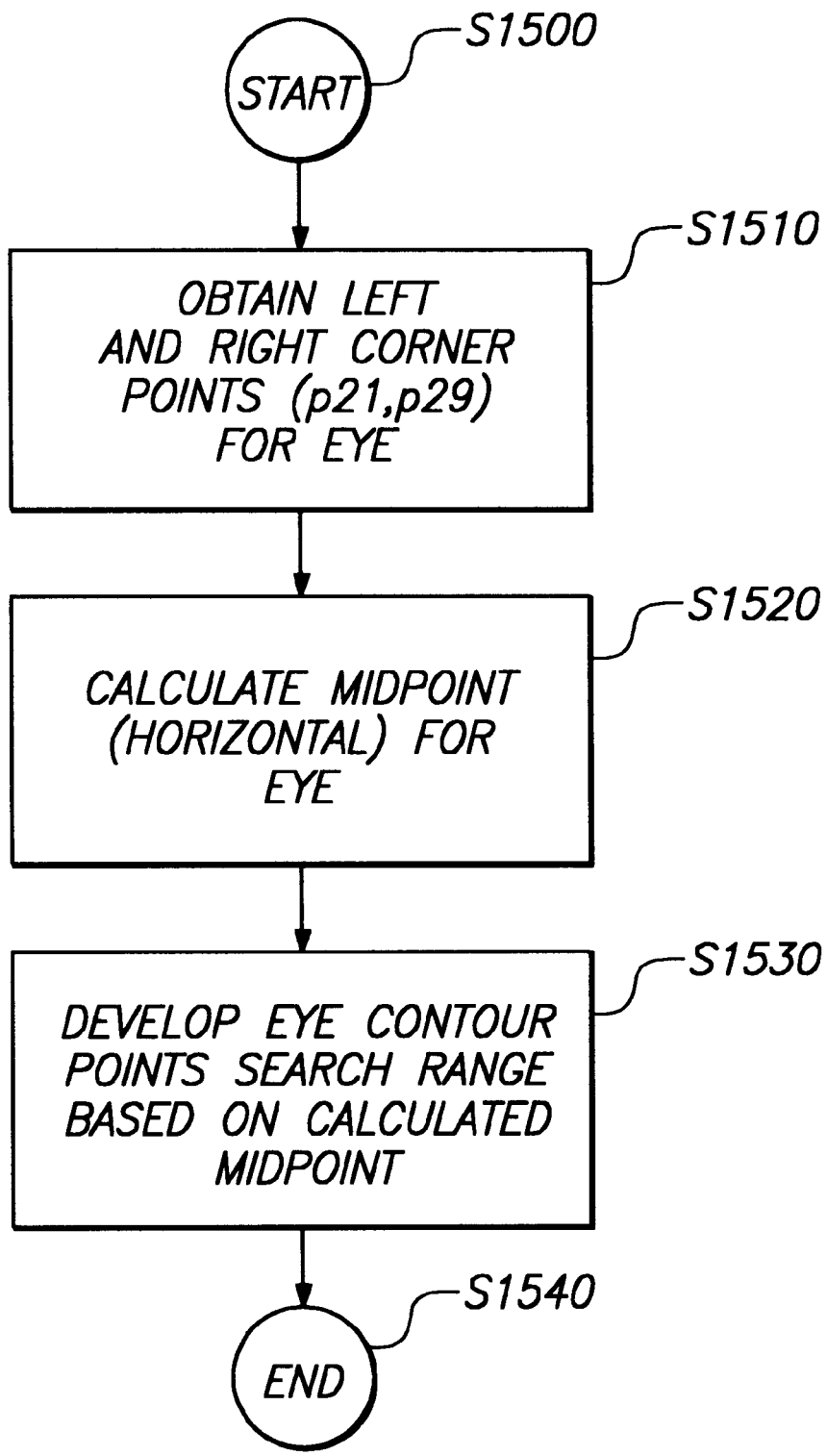
FIG. 23 is a flowchart illustrating eye contour extraction according to the second embodiment.

With the second embodiment thus comprised, it is necessary to extract the coordinate values of contour points p21 . . . p36 forming the contour of the eye, and point p37 representing the pupil, as shown in FIG. 10 based on the area, for the one eye in this example, extracted by feature unit extractor 4. To extract the coordinates of the points p21 . . . p36 forming the eye contour, the most common method as shown in FIG. 23 (steps S1500–S1540) is to first extract the coordinates of the two end points p21 and p29 in the x-axis direction (specifically, the right and left end points at the longest part in the x-axis direction of the area extracted as the eye), and then extract the coordinates of the two top and bottom points p25 and p33 in the y-axis direction (specifically, the top and bottom points with the greatest distance therebetween in the y-axis direction of the area extracted as the eye). The coordinates of the two top and bottom points p25 and p33 are extracted by this second embodiment of the present invention by first defining a searching range (dotted line area E9 as shown in FIG. 10) including the midpoint between the right and left end points p21 and p29 (Step S1520), and then searching for the top and bottom points p25 and p33 only within searching range E9.

The size of searching range E9 is determined by obtaining the range $$\frac{dx}{2}$$

(where dx=x2−x1 as described in the first embodiment) above and below the user-defined eye center coordinates in the y-axis direction (S1530), and one-tenth of the length between right and left eye contour end points p21 and p29 on either side of the eye center coordinates in the x-axis direction. It is to be noted, however, that the present invention shall not be limited to this range definition, and other searching range sizes can also be used in particular applications.

Why the searching range for obtaining the top and bottom end points of the eye contour is based on the midpoint between the right and left end points of the eye contour is described below.

Specifically, the overall shape of the eyes and mouth is generally oval. The top and bottom points p25 and p33 in the y-axis direction (specifically, the top and bottom points with the greatest distance therebetween in the y-axis direction) are therefore normally located in the middle between the right and left ends of the eye. However, if there are so-called "whiskers" caused by noise in the area above or below the right or left end points p21, p29 of the eye, those noise points may be erroneously processed as the top and bottom end points. If the coordinates of these noise points are extracted as the top and bottom end points, and the image is then processed using this coordinate data, unnaturally-shaped, undesirable eye contours may result. To prevent this, the searching range for the top and bottom points p25 and p33 is restricted to an area in the middle of the eye contour. Note that this principle is not limited to the eyes, and is similarly applied when extracting the mouth coordinate data.

Figure 11:
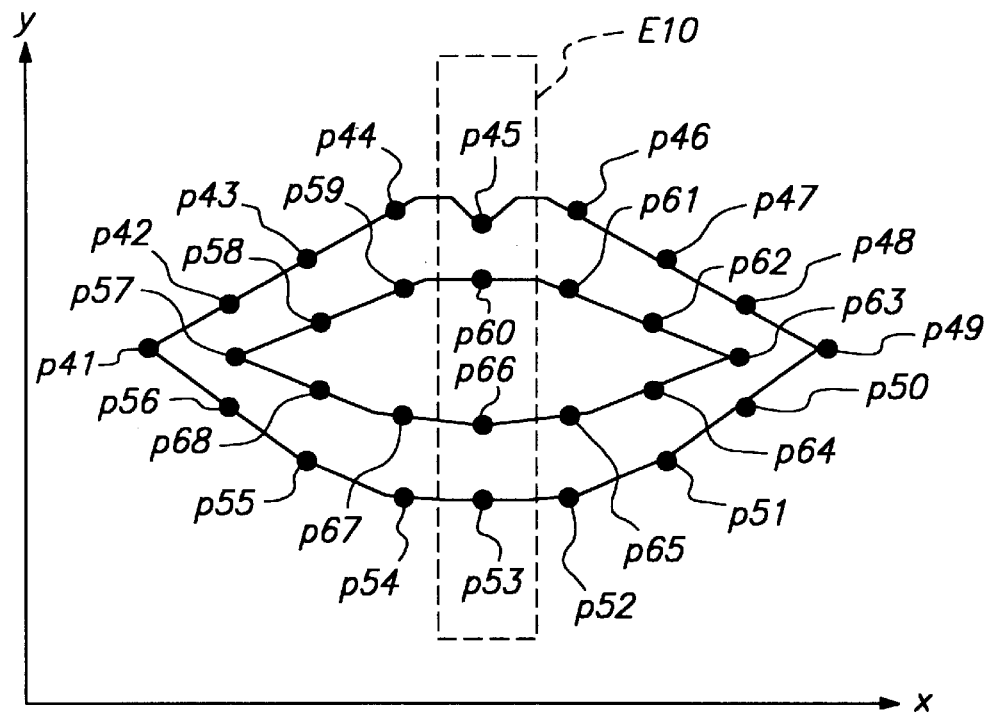
FIG. 11 is used to describe extracting the contour points forming the mouth contour according to the second embodiment of the invention.

In the case of the mouth, a searching range (dotted area E10 in FIG. 11) is similarly defined to locate the top and bottom end points. Referring to FIG. 11, points p41 . . . p56 define the outside contour of the mouth (lips). The size of searching range E10 is determined by obtaining the range $$\frac{dx}{2}$$

(where dx=x2−x1 as described in the first embodiment) above and below the user-defined mouth center coordinates in the y-axis direction, and one-tenth of the length between right and left mouth contour end points p41 and p49 on either side of the mouth center coordinates in the x-axis direction. It is to be noted, however, that the present invention shall not be limited to this range definition, and other searching range sizes can also be used.

Because the area of the mouth is relatively large compared with the area of the eyes, limiting the size of the searching range in the y-axis direction as shown in FIG. 11 greatly reduces the processing time required to find the top and bottom end points. Furthermore, in images in which the subject's mouth is open and the lips are extended to the sides, symmetrical contour points on the outside contour of the lips are substantially level (points p43 and p47, and points p55 and p51, for example, are essentially level in FIG. 11), the area of the searching range for the top and bottom end points is larger, it can be difficult to accurately identify the desired end points, and false contour points caused by noise in the horizontal areas may be wrongly processed as the end points. A searching range as shown by the dotted area E10 in FIG. 11 is therefore set, and the top and bottom end points are obtained only within this searching range.

After the right and left end point coordinates and the top and bottom end point coordinates are obtained, the coordinates of the contour points between the end points are obtained. In the case of the mouth, for example, the coordinates of point p43 and the symmetrical point p55 (i.e., top and bottom contour points having the same x-axis coordinate), and point p47 and the symmetrical point p51 (again, the top and bottom contour points having the same x-axis coordinate), are obtained.

Figure 12:
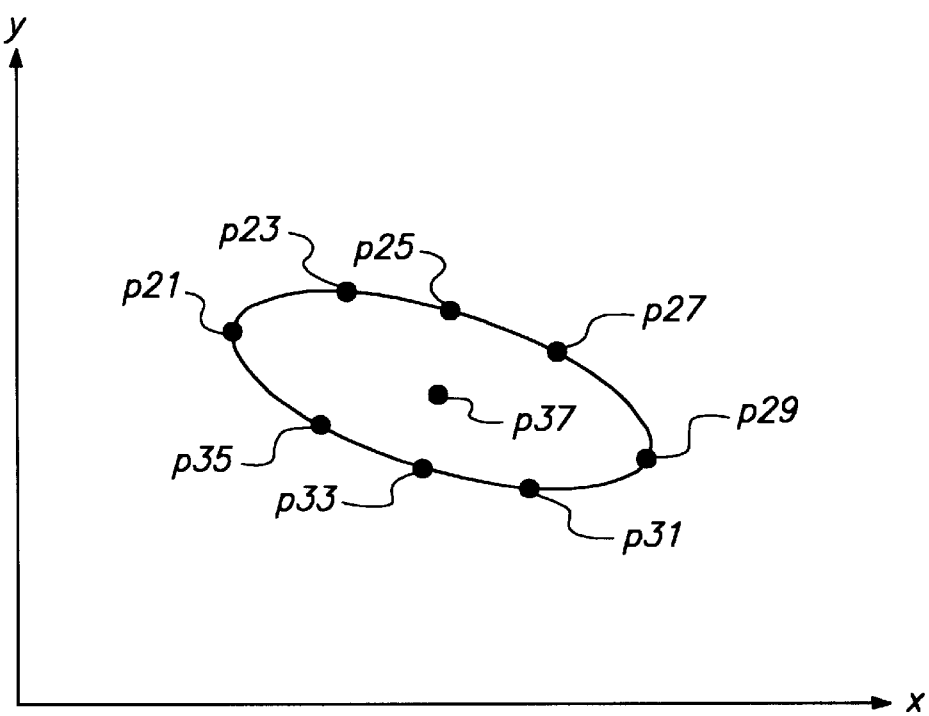
FIG. 12 is used to describe extracting the contour points forming the eye contour according to the second embodiment of the invention when the eye is on an angle.

If the eye is slightly slanted as shown in FIG. 12, the coordinates of the points between the right and left end points and top and bottom end points are obtained as described below based on the coordinates of the previously-obtained right and left end points p21, p29 and top and bottom end points p25, p33. Note that the coordinates of point p23 and the corresponding point p35 (the x-axis coordinates of which are different in this case because the eye is slanted), and point p27 and the corresponding point p31 (also having different x-axis coordinates), are used as the midpoints to be obtained below.

For example, referring to FIG. 12, the x-axis coordinate of point p23 is the average of the x-axis coordinates of points p21 and p25, and the y-axis coordinate is the maximum y-coordinate candidate in the area of that x-axis coordinate. The x-axis coordinate of point p35 is likewise the average of the x-axis coordinates of points p21 and p33, and the y-axis coordinate is the maximum y-coordinate candidate in the area of the selected x-axis coordinate. The coordinate data for points p27 and p33 is obtained in the same manner.

Once the coordinate data of each of the contour points is thus obtained, extracted content evaluator 6 determines whether there are any errors in the extracted content. If not, the coordinate data thus obtained is output.

Figure 13:
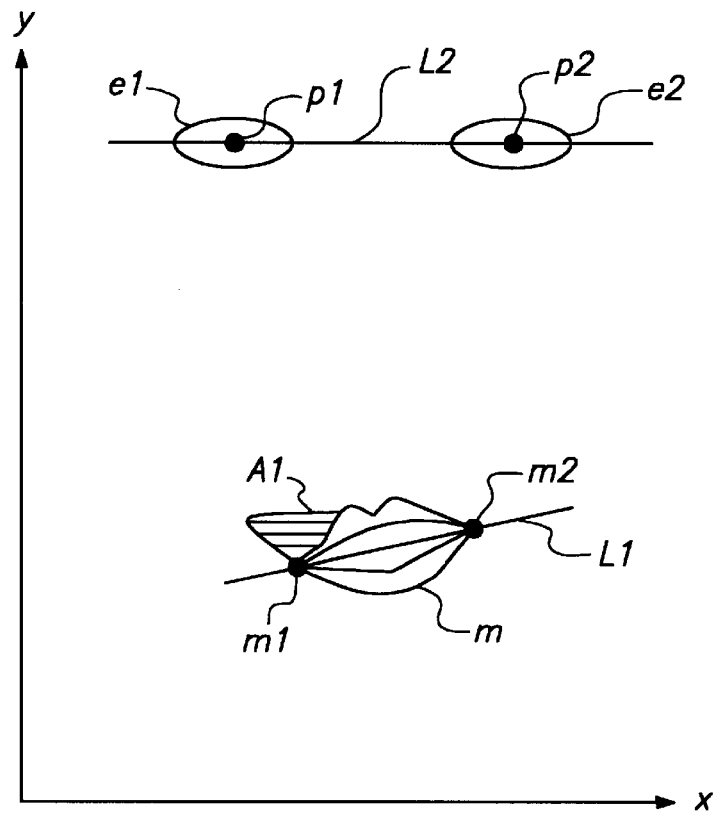
FIG. 13 is used to describe evaluating the extracted content of the mouth image according to the second embodiment of the invention.

An example of the evaluation process executed by extracted content evaluator 6 is described below. For example, the lighting may create shadows causing contour points within shaded area A1 in FIG. 13 to not be extracted, resulting in a slanted mouth image as shown in FIG. 13. In the case shown in FIG. 13, the subject was illuminated by lighting from the right side, resulting in shadow A1. While the correct shape of the mouth should normally include the shaded area A1, the color data of the pixels in this area is changed by the lighting, and the shape of the extracted mouth profile slopes down to the left as indicated by line L1.

Contours extracted in this manner can be determined to be correct or incorrect by checking the slope of the extracted mouth contour. Specifically, if the slope of line L1 connecting left and right end points m1 and m2 of extracted mouth m is greater than a predetermined angle relative to line L2 connecting the center points of the left and right eyes e1 and e2, the extracted mouth contour is determined to be wrong and re-processing is requested. The angle appropriate as this predetermined angle has been demonstrated through tests to be ±7°.

When obtaining the coordinates of the contour points forming the facial contour, any particular extracted contour point may be positioned closer to the inside of the face (the nose side of the facial contour) relative to the two adjacent contour points. This is shown, for example, in FIG. 14 where contour point p73 is positioned noticeably to the inside of the facial contour. This may result when there is a beard or conspicuous skin wrinkle in that area, thus causing a luminance value exceeding the threshold value to be detected and returned as a false contour point. When this happens, the facial contour becomes significantly concave in that area, and an unnatural facial image results.

To resolve this problem, the average value of the coordinates of the two adjacent contour points is obtained, and it is detected whether the coordinates of the contour point between these two contour points are positioned to the inside of the face from this average coordinate point. If the middle contour point is to the inside, the average of the coordinates is substituted for the coordinates of that inside contour point. This is described with reference to FIG. 14.

Figure 14:
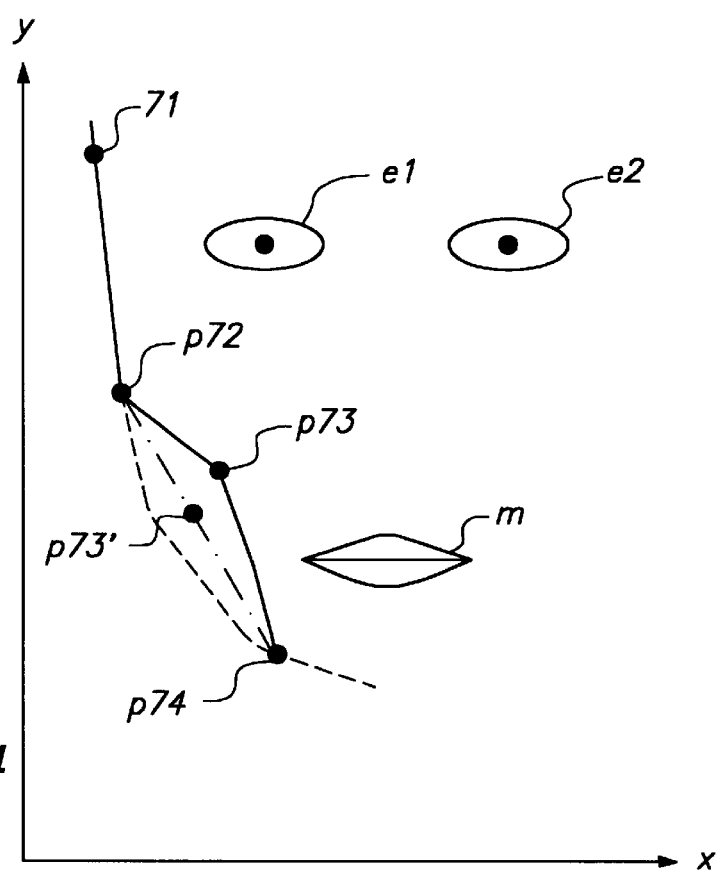
FIG. 14 is used to describe the method of evaluating the extracted content of the facial contour image in the second embodiment of the invention.

As shown in FIG. 14, contour point p73 can be determined to be inside of average coordinate point p73', which is the average of points p72 and p74, by comparing the respective coordinate data. As a result, the coordinates for average coordinate point p73' are substituted for the coordinates of contour point p73. The facial contour is therefore approximated by the dot-dash line curve linking contour points p71, p72, p73', and p74, and the resulting facial contour more closely approximates the natural facial image.

By means of a specific point being pre-defined in the facial image data for each of plural facial features to be extracted, facial image processing according to the present invention as described hereinabove sets, for each facial feature to be extracted, a searching range for extracting said facial features based on the coordinate data of said specific points and referenced to the specific point specified for each facial feature, and extracts the area of each of the facial features within the corresponding searching range. As a result, processing is greatly simplified when compared with methods extracting facial features from the entire facial image, and processing time can therefore be greatly reduced, because the facial features are extracted from a limited searching range. Furthermore, because the respective facial features are extracted from within defined image areas, false extraction of other facial features in place of the desired facial features rarely occurs, and the facial feature the user wishes to extract can be reliably extracted.

Further, the facial features for which said specific points are set are the right and left eyes and the mouth, and the facial features for which the area is extracted after setting the searching ranges based on the coordinate data for said three points are the mouth, right and left eyes, eyebrows, and the facial contour. It is therefore extremely simple to specify these points. Furthermore, because the mouth, right and left eyes, eyebrows, and the facial contour are extracted using searching ranges defined according to the coordinates of these pre-defined points, most of the primary facial features can be reliably and simply extracted, and the searching ranges can be dynamically set for faces of different sizes.

Also, the searching range for the mouth area may be set in the x-axis and y-axis directions to include the mouth area referenced to the point specified as the mouth based on the difference between the x-coordinate data of the points specified as the right and left eyes, where the x-coordinate axis represents the side-to-side direction of the facial image and the y-coordinate axis represents the vertical direction of the facial image. It is therefore possible to set an optimal searching range for extracting the mouth area, and the mouth area can be simply and reliably extracted.

Also, the searching range for the mouth area may be set in the x-axis and y-axis directions to include the mouth area referenced to the point specified as the mouth based on the difference between the x-coordinate data of the points specified as the right and left eyes, and the average of the differences between the y-axis coordinate of the point specified as the mouth and the y-axis coordinates of the points specified as the right and left eyes. It is therefore possible to set an even more optimal searching range for extracting the mouth area, and the mouth area can be simply and reliably extracted.

Moreover, the searching ranges for the eyes may be set in the x-axis and y-axis directions to include the eyes referenced to the points specified as the right and left eyes based on the difference between the x-axis coordinate data of the points specified therefor. It is therefore possible to set an optimal searching range for extracting the eye areas, and the eye areas can be simply and reliably extracted.

Further, as discussed hereinabove, the searching ranges for the eyebrows are set in the x-axis and y-axis directions to include the eyebrows referenced to the points specified as the right and left eyes and based on the difference between the x-axis coordinate data of the points specified as the right and left eyes. It is therefore possible to set an optimal searching range for extracting the eyebrow areas, and the eyebrow areas can be simply and reliably extracted.

Further still, the searching ranges for the facial contours in the areas at the eye height in the y-axis direction may be set in the x-axis and y-axis directions to include said facial contours referenced to the points specified as the right and left eyes and based on the average of the differences between the y-axis coordinate of the point specified as the mouth and the y-axis coordinates of the points specified as the right and left eyes. It is therefore possible to set optimal searching ranges for extracting the facial contours in the areas at eye height, and the facial contour areas can be simply and reliably extracted.

Also, the searching range for the facial contour in the area at the mouth height in the y-axis direction may be set in the x-axis and y-axis directions to include said facial contour referenced to the point specified as the mouth and based on the average of the differences between the y-axis coordinate of the point specified as the mouth and the y-axis coordinates of the points specified as the right and left eyes. It is therefore possible to set optimal searching ranges for extracting the facial contours in the areas at the mouth height, and the facial contour areas can be simply and reliably extracted.

Likewise, the searching range for the facial contour in the area of the mouth in the x-axis direction may be set in the x-axis and y-axis directions to include said facial contour referenced to the point specified as the mouth based on the average of the differences between the y-axis coordinate of the point specified as the mouth and the y-axis coordinates of the points specified as the right and left eyes. It is therefore possible to set an optimal searching range for extracting the facial contour in the chin area, and the facial contour can be simply and reliably extracted.

According to a further aspect of the invention, a specific point is defined in the facial image data for each of plural facial features to be extracted; a searching range for extracting the areas of said facial features is set for each facial feature to be extracted based on the coordinate data of said specific points and referenced to the specific point specified for each facial feature; the areas of said facial features are extracted within the set searching ranges; the coordinate data of the contour points forming each facial feature contour is extracted from the facial feature areas; and the relative positions of the extracted feature images are evaluated based on the coordinate values of specific points in the facial feature areas to determine whether the facial features were correctly extracted. It is therefore possible to check whether facial feature extraction was correctly executed and to request reprocessing if there is an extraction error, and it is therefore possible to eliminate extraction errors.

Also, the evaluation process for evaluating correct extraction of the mouth area extracted in the searching range set therefor may compare the y-axis coordinates of the right and left end points in the x-axis direction of the extracted mouth area with the y-axis coordinate of the midpoint in the x-axis direction at the top edge of the extracted mouth area. In this case, the y-axis coordinate of the midpoint in the x-axis direction is smaller than the y-axis coordinate of either right or left end point in the x-axis direction of said mouth area, the extracted mouth area is determined to represent an open mouth, the extracted mouth image is determined to be the lower lip only, and a searching range for extracting the upper lip is therefore set. Extraction of only the lower lip area can therefore be prevented in facial images in which the subject is smiling, for example, and the entire mouth area can be extracted when the mouth is open in the image.

Further, the evaluation process for determining correct extraction of the eyes or mouth may determine whether the eyes or mouth were correctly extracted by determining whether the respective points specified by the user as the center of the eyes or mouth are contained within the extracted areas. It is therefore possible to easily and reliably determine whether the eyes or mouth were correctly extracted.

Further still, the evaluation process for determining correct extraction of the eyebrows determines whether the eyebrow areas were correctly extracted by evaluating the positions of the coordinates of the right and left end points of the extracted eyebrow area relative to the coordinates of the point specified as the corresponding eye. It is therefore possible to easily and reliably determine whether the eyebrow areas were correctly extracted.

According to the second embodiment of the present invention, the contour points forming the contours of the eyes and mouth in the corresponding facial feature areas are extracted after extracting the area of each facial feature, the coordinates of the right and left end points in the x-axis direction of said facial feature areas are then obtained from said contour points; a searching range with a width in the x-axis direction equal to a known ⅓ fraction of the distance between the right and left end points of the respective facial feature area is set in each area near the midpoint between said right and left end points; and the coordinates of the top and bottom end points in the y-axis direction of the eye or mouth facial feature areas are then obtained within said searching range. As a result, the contour points at the highest and lowest parts of said contour lines can be reliably obtained without being affected by noise.

Further, according to this embodiment, the coordinates of the contour points between the obtained four right, left, top, and bottom end points are obtained with the x-axis coordinate thereof calculated as the average of the x-axis coordinates of the contour points on either side of the contour point being calculated. It is therefore possible to easily and reliably extract the intermediate contour points between the end points, particularly in facial images where the eye profiles are slanted or drooping.

Also, the relative positions of the extracted facial feature areas are evaluated based on the coordinate values of a specific point in each facial feature area to determine whether the facial feature areas were correctly extracted. It is therefore possible to check whether facial feature extraction was correctly executed and to request reprocessing if there is an extraction error, and it is therefore possible to eliminate extraction errors.

For the second embodiment disclosed hereinabove, this evaluation process for evaluating correct extraction of the mouth area may determine whether the extracted area is correct by determining whether a line connecting the right and left end points in the x-axis direction of the mouth area is sloped greater than a predetermined angle relative to a line through a specific point in each of the right and left eyes. It is therefore possible to detect when the extracted image area is unnaturally curved as a result lighting-induced shadowing causing part of the mouth area image to be lost. In addition, evaluation errors can be prevented when extracting facial features when the entire facial image is on an angle because the angle of the mouth is also referenced to a known line passing through the eyes.

Finally, the evaluation process for evaluating correct extraction of the facial contour area may process the plural contour points forming the facial contour in units of three adjacent contour points, compares the coordinates of the middle of each three contour points with the average of the coordinates of the two adjacent contour points, and substitutes the average of the coordinates of the two adjacent contour points for the coordinates of the middle contour point if the position of the middle contour point is determined to be to the inside of the face relative to the adjacent contour points. It is therefore possible to determine when the facial contour is unnaturally concave due to a beard or pronounced skin wrinkle in the facial image. Correction of such unnatural concave facial curves can therefore be easily accomplished, and a more natural facial contour can be obtained.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A facial image processing method for extracting facial features and outputting the corresponding coordinate data based on facial image data, wherein:

a specific point is defined in the facial image data for each of the right and left eyes and the mouth;

a searching range is set for each facial feature to be extracted, including the right and left eyes and the mouth, based on the coordinate data of at least one of said specific points and referenced to the specific point specified for that facial feature for which the searching range is being set, where the x-coordinate axis represents the side-to-side direction of the facial image and the y-coordinate axis represents the vertical direction of the facial image;

an area of each of the right and left eyes and the mouth is extracted within the corresponding searching range; and it is determined whether the extracted mouth area is correct by determining whether a line connecting right and left end points in the x-axis direction of the mouth area is greater than a predetermined angle relative to a line through a particular point in each of the right and left eyes.

2. A facial image processing method according to claim 1, wherein a searching range is set for each of plurality of additional facial features including the eyebrows, a facial contour to the outside of the right eye and a facial contour to the outside of the left eye, wherein the searching range for each of the facial contours outside of the eyes is set in the x-axis and y-axis directions to include that facial contour referenced to the point specified as the corresponding eye based on the average of the differences between the y-axis coordinate of the point specified as the mouth and the y-axis coordinates of the points specified as the right and left eyes; and an area of each of the additional facial features for which a searching range is set is extracted within the corresponding searching range.

3. A facial image processing method according to claim 2, wherein the searching range for the mouth area is set in the x-axis and y-axis directions to include the mouth area referenced to the point specified as the mouth based on the difference between the x-coordinate data of the points specified as the right and left eyes.

4. A facial image processing method according to claim 2, wherein the searching range for the mouth area is set in the x-axis and y-axis directions to include the mouth area referenced to the point specified as the mouth based on;

the difference between the x-coordinate data of the points specified as the right and left eyes, and the average of the differences between the y-axis coordinate of the point specified as the mouth and the y-axis coordinates of the points specified as the right and left eyes.

5. A facial image processing method according to claim 2, wherein the searching ranges for the eyes are set in the x-axis and y-axis directions to include the eyes referenced to the points specified as the right and left eyes based on the difference between the x-axis coordinate data of the points specified as the right and left eyes.

6. A facial image processing method according to claim 2, wherein the searching ranges for the eyebrows are set in the x-axis and y-axis directions to include the eyebrows referenced to the points specified as the right and left eyes based on the difference between the x-axis coordinate data of the points specified as the right and left eyes.

7. A facial image processing method according to claim 1, wherein a searching range for facial contour in an area at the mouth height in the y-axis direction is set in the x-axis and y-axis directions to include said facial contour in the area at the mouth height referenced to the point specified as the mouth based on the average of the differences between the y-axis coordinate of the point specified as the mouth and the y-axis coordinates of the points specified as the right and left eyes.

8. A facial image processing method according to claim 2, wherein a searching range for facial contour in an area on at least one side of the mouth in the x-axis direction is set in the x-axis and y-axis directions to include said facial contour in the area on at least one side of the mouth referenced to the point specified as the mouth based on the average of the differences between the y-axis coordinate of the point specified as the mouth and the y-axis coordinates of the points specified as the right and left eyes.

9. A facial image processing method for extracting facial features and outputting the corresponding coordinate data based on facial image data, wherein:

a specific point is defined in the facial image data for each of the right and left eyes and the mouth;

a searching range for extracting the areas of said facial features is set for each facial feature to be extracted, including the right and left eyes, the mouth and at least one facial contour, based on the coordinate data of at least one of said specific points and referenced to the specific point specified for that facial feature for which the searching range is being set, where the x-coordinate axis represents the side-to-side direction of the facial image and the y-coordinate axis represents the vertical direction of the facial image;

the areas of said facial features are extracted within the set searching ranges; and the coordinate data of contour points forming each facial feature contour is extracted from the facial feature areas; and the relative positions of the extracted feature images are evaluated based on the coordinate values of specific points in the facial feature areas to determine whether the facial features were correctly extracted, wherein the evaluation process for determining correct extraction of the mouth area includes determining whether a line connecting right and left end points in the x-axis direction of the mouth area is greater than a predetermined angle relative to a line through a particular point in each of the right and left eyes.

10. A facial image processing method for extracting facial features and outputting the corresponding coordinate data based on facial image data, wherein:

a specific point is defined in the facial image data for each of plural facial features to be extracted;

a searching range for extracting the areas of said facial features is set for each facial feature to be extracted based on the coordinate data of said specific points and referenced to the specific point specified for each facial feature;

the areas of said facial features are extracted within the set searching ranges;

the coordinate data of the contour points forming each facial feature contour is extracted from the facial feature areas; and the relative positions of the extracted feature images are evaluated based on the coordinate values of specific points in the facial feature areas to determine whether the facial features were correctly extracted;

wherein the evaluation process for determining correct extraction of the mouth area extracted in the searching range set for extracting the mouth area:

compares the y-axis coordinates of the right and left end points in the x-axis direction of the extracted mouth area with the y-axis coordinate of the midpoint in the x-axis direction at the top edge of the extracted mouth area where the x-coordinate axis represents the side-to-side direction of the facial image and the y-coordinate axis represents the vertical direction of the facial image; and determines the extracted mouth area to represent an open mouth when the y-axis coordinate of the midpoint in the x-axis direction is smaller than the y-axis coordinate of either right or left end point in the x-axis direction of said mouth area, determines the extracted mouth to be the lower lip only, and sets a searching range for extracting the upper lip.

11. A facial image processing method according to claim 9, wherein the evaluation process for determining correct extraction of the eyes or mouth determines whether the eyes or mouth were correctly extracted by determining whether the respective points specified for the eyes or mouth are contained within the extracted areas.

12. A facial image processing method according to claim 9, wherein the plurality of facial features includes the eyebrows, wherein a searching range is set for the eyebrows, and wherein the evaluation process for determining correct extraction of the eyebrows determines whether the eyebrow areas were correctly extracted by evaluating the positions of the coordinates of right and left end points of the extracted eyebrow area relative to the coordinates of the points specified as the eyes.

13. A facial image processing method for extracting facial features and outputting the corresponding coordinate data based on facial image data, wherein the area of each facial feature is extracted using a coordinate system wherein the x-coordinate axis represents the side-to-side direction of the facial image and the y-coordinate axis represents the vertical direction of the facial image, the contour points forming the contours of the eyes and mouth in the corresponding facial feature areas extracted by the facial feature extracting means are obtained, the coordinates of the right and left end points in the x-axis direction of said facial feature areas are then obtained from said contour points, a searching range with a width in the x-axis direction equal to a known ⅕ fraction of the distance between the right and left end points of the respective facial feature area is set in each area near the midpoint between said right and left end points, and the coordinates of the top and bottom end points in the y-axis direction of the eye or mouth facial feature areas are obtained within said searching range.

14. A facial image processing method according to claim 13, wherein:

the coordinates of the contour points between the obtained four right, left, top, and bottom end points are obtained with the x-axis coordinate thereof calculated as the average of the x-axis coordinates of the contour points on either side of the contour point being calculated.

15. A facial image processing method for extracting facial features and outputting the corresponding coordinate data based on facial image data, wherein:

after extracting the areas of the facial features, the relative positions of the extracted areas are evaluated based on the coordinate values of a specific point in each facial feature area to determine whether the facial feature areas were correctly extracted; and when the extracted area is the mouth area, it is determined whether the extracted area is correct by determining whether a line connecting the right and left end points in the x-axis direction of the mouth area is sloped greater than a predetermined angle relative to a line through a specific point in each of the right and left eyes, where the x-coordinate axis represents the side-to side direction of the facial image and the y-coordinate axis represents the vertical direction of the facial image.

16. A facial image processing method for extracting facial features and outputting the corresponding coordinate data based on facial image data, wherein:

after extracting the areas of the facial features, the relative positions of the extracted areas are evaluated based on the coordinate values of a specific point in each facial feature area to determine whether the facial feature areas were correctly extracted; and when the extracted area is a facial contour area, the plural contour points forming the facial contour are processed in units of three adjacent contour points, the coordinates of the middle of each three contour points are compared with the average of the coordinates of the two adjacent contour points, and the average of the coordinates of the middle contour point if the position of the substituted for the coordinates of the middle contour point if the position of the middle contour point is determined to be to the inside of the face relative to the adjacent contour points, where the x-coordinate axis represents the side-to-side direction of the facial image and the y-coordinate axis represents the vertical direction of the facial image.

17. A facial image processing apparatus for extracting facial features and outputting the corresponding coordinate data based on facial image data comprises:

facial feature searching range setting means for setting, for each facial feature to be extracted, a searching range based on the coordinate data of specific points and referenced to a particular one of the specific points specified for that facial feature, said specific points being pre-defined in the facial image data for each of the right and left eyes and the mouth;

wherein said facial feature searching range setting means comprises mouth searching range setting means and facial contour searching range setting means which sets ranges in the x-axis and y-axis directions to include facial contours referenced to the points specified as the right and left eyes as the searching ranges for the facial contours in the areas at the eye height in the y-axis direction based on the average of the differences between the y-axis coordinate of the point specified as the mouth and the y-axis coordinates of the points specified as the right and left eyes, where the x-coordinate axis represents the side-to-side direction of the facial image and the y-coordinate axis represents the vertical direction of the facial image; and facial feature extracting means for extracting an area of each facial feature, including the mouth, within the searching range set by each corresponding facial feature searching range setting means;

wherein it is determined whether the extracted mouth area is correct by determining whether a line connecting right and left end points in the x-axis direction of the mouth area is greater than a predetermined angle relative to a line through a particular point in each of the right and left eyes.

18. A facial image processing apparatus according to claim 17, wherein eyes searching range setting means, and eyebrows searching range setting means are further disposed as the facial feature searching range setting means;

a mouth area extracting means, eye area extracting means, eyebrow area extracting means, and facial contour extracting means are disposed as the facial feature extracting means; and the contours of the mouth, right and left eyes, eyebrows, and the facial contour are extracted by the respective extracting means after the respective searching ranges are set by the respective searching range setting means based on the coordinate data of the points specified for the right and left eye and mouth.

19. A facial image processing apparatus according to claim 17, wherein the mouth searching range setting means sets a range in the x-axis and y-axis directions including the mouth area referenced to the point specified as the mouth as the mouth searching range based on the difference between the x-coordinate data of the points specified as the right and left eyes.

20. A facial image processing apparatus according to claim 17, wherein the mouth searching range setting means sets a range in the x-axis and y-axis directions including the mouth area referenced to the point specified as the mouth as the mouth searching range based on the difference between the x-coordinate data of the points specified as the right and left eyes, and the average of the differences between the y-axis coordinate of the point specified as the mouth and the y-axis coordinates of the points specified as the right and left eyes.

21. A facial image processing apparatus according to claim 18, wherein the eyes searching range setting means sets a range in the x-axis and y-axis directions including the eye area referenced to the point specified as the eye as the eye searching range based on the difference between the x-axis coordinate data of the points specified as the right and left eyes.

22. A facial image processing apparatus according to claim 18, wherein the eyebrows searching range setting means sets a range in the x-axis and y-axis directions including the eyebrow area referenced to the point specified as the corresponding eye as the eyebrow searching range based on the difference between the x-axis coordinate data of the points specified as the right and left eyes.

23. A facial image processing apparatus according to claim 17, wherein the facial contour searching range setting means sets ranges in the x-axis and y-axis directions at the mouth height in the y-axis direction to include the facial contours in the mouth area referenced to the point specified as the mouth based on the average of the differences between the y-axis coordinate of the point specified as the mouth and the y-axis coordinates of the points specified as the right and left eyes.

24. A facial image processing apparatus according to claim 18, wherein the facial contour searching range setting means sets a range in the x-axis and y-axis directions in the area of the mouth in the x-axis direction to include the facial contour in the mouth area referenced to the point specified as the mouth based on the average of the differences between the y-axis coordinate of the point specified as the mouth and the y-axis coordinates of the points specified as the right and left eyes.

25. A facial image processing apparatus for extracting facial features and outputting corresponding coordinate data based on facial image data comprises:

facial feature searching range setting means for setting, for each facial feature to be extracted, a searching range based on a plurality of specific points including contour points and referenced to a particular one of the plurality of the specific points specified for that facial feature, said specific points being pre-defined in the facial image data for at least the right and left eyes and the mouth;

facial feature extracting means for extracting an area of each facial feature, including the mouth, within the searching range set by each corresponding facial feature searching range setting means;

wherein said searching range setting means sets ranges for facial contours in areas outside of the eyes and in an area on at least one side of the mouth to include said facial contours referenced to the points specified as the right and left eyes based on the average of the differences between the y-axis coordinate of the point specified as the mouth and y-axis coordinates of the points specified as the right and left eyes, where the x-coordinate axis represents the side-to-side direction of the facial image and the y-coordinate axis represents the vertical direction of the facial image;

contour point extracting means for extracting the coordinate data of contour points forming the contour of each facial feature based on the respective areas obtained by the facial feature extracting means; and extracted content evaluating means for evaluating, based on the coordinate values of a specific point in the area of each facial feature, the relative positions of the extracted feature images to determine whether said facial features were correctly extracted, wherein the evaluation process for determining correct extraction of the mouth area includes determining whether a line connecting right and left end points in the x-axis direction of the mouth area is greater than a predetermined angle relative to a line through a particular point in each of the right and left eyes.

26. A facial image processing apparatus for extracting facial features and outputting the corresponding coordinate data based on facial image data comprising:

facial feature searching range setting means for setting, for each facial feature to be extracted, a searching range based on a plurality of specific points including contour points and referenced to a particular one of the plurality of the specific points specified for that facial feature, said specific points being pre-defined in the facial image data for at least the right and left eyes and the mouth;

facial feature extracting means for extracting an area of each facial feature, including the mouth, within the searching range set by each corresponding facial feature searching range setting means;

contour point extracting means for extracting the coordinate data of contour points forming the contour of each facial feature based on the respective areas obtained by the facial feature extracting means; and extracted content evaluating means for evaluating, based on the coordinate values of a specific point in the area of each facial feature, the relative positions of the extracted feature images to determine whether said facial features were correctly extracted; wherein the extracted content evaluating means, in the evaluation process for determining correct extraction of the mouth area extracted by the mouth area extracting means, compares the y-axis coordinates of the right and left end points in the x-axis direction of the extracted mouth area with the y-axis coordinate of the midpoint in the x-axis direction at the top edge of the extracted mouth area
where the x-coordinate axis represents the side-to-side direction of the facial image and the y-coordinate axis represents the vertical direction of the facial image; and determines the extracted mouth area to represent an open mouth when the y-axis coordinate of the midpoint in the x-axis direction is smaller than the y-axis coordinate of either right or left end point in the x-axis direction of said mouth area, determines the extracted mouth to be the lower lip only, and sets a searching range for extracting the upper lip.

27. A facial image processing apparatus according to claim 25, wherein the extracted content evaluating means, when the extracted content is an eye or the mouth, evaluates correct extraction of the eye or mouth by determining whether the respective points specified for the eyes or mouth are contained within the extracted areas.

28. A facial image processing apparatus according to claim 25, wherein the extracted content evaluating means, when the extracted content is an eyebrow area, evaluates correct extraction of the eyebrow area by evaluating the positions of the coordinates of the right and left end points of the extracted eyebrow area relative to the coordinates of the point specified as the corresponding eye.

29. A facial image processing apparatus for extracting facial features and outputting the corresponding coordinate data based on facial image data comprises:

facial feature extracting means for extracting the area of each facial feature using a coordinate system wherein the x-coordinate axis represents the side-to-side direction of the facial image and the y-coordinate axis represents the vertical direction of the facial image; and facial feature contour point extracting means for obtaining the contour points forming the contour of the eyes or mouth in the facial feature area extracted by the facial feature extracting means, and then obtaining from said contour points the coordinates of the right and left end points in the x-axis direction of said facial feature area, then setting, in the area near the midpoint between said right and left end points, a searching range with a width in the x-axis direction equal to a known $1/n$ fraction of the distance between the right and left end points, and obtaining within said searching range the coordinates of the top and bottom end points in the y-axis direction of the eye or mouth area.

30. A facial image processing apparatus according to claim 29, wherein:

the coordinates of the contour points between the obtained four right, left, top, and bottom end points are obtained with the x-axis coordinate thereof calculated as the average of the x-axis coordinates of the contour points on either side of the contour point being calculated.

31. A facial image processing apparatus for extracting facial features and outputting the corresponding coordinate data based on facial image data comprising:

facial feature extracting means for extracting the area of each facial feature;

contour point extracting means for obtaining the contour points forming the contour of the facial feature based on the area extracted by the facial feature extracting means; and extracted content evaluating means for evaluating the relative positions of the extracted areas based on the coordinate values of a specific point in each facial feature area to determine whether the facial feature areas were correctly extracted; wherein:

the extracted content evaluating means, when the extracted feature is the mouth, determines whether the extracted area is correct by determining whether a line connecting the right and left end points in the x-axis direction of the mouth area is sloped greater than a predetermined angle relative to a line through a specific point in each of the right and left eyes,
where the x-coordinate axis represents the side-to-side direction of the facial image and the y-coordinate axis represents the vertical direction of the facial image.

32. A facial image processing apparatus for extracting facial features and outputting the corresponding coordinate data based on facial image data comprising:

facial feature extracting means for extracting the area of each facial feature;

contour point extracting means for obtaining the contour points forming the contour of the facial feature based on the area extracted by the facial feature extracting means; and extracted content evaluating means for evaluating the relative positions of the extracted areas based on the coordinate values of a specific point in each facial feature area to determine whether the facial feature areas were correctly extracted; wherein:

the extracted content evaluating means, when the extracted area is a facial contour area, determines whether the extracted area is correct by
processing the plural contour points forming the facial contour in units of three adjacent contour points, and
comparing the coordinates of the middle of each three contour points with the average of the coordinates of the two end contour points, and substitutes the average of the coordinates of the two end contour points for the coordinates of the middle contour point if the position of the middle contour point is determined to be to the inside of the face relative to the adjacent contour points, where the x-coordinate axis represents the side-to-side direction of the facial image and the y-coordinate axis represents the vertical direction of the facial image.

33. A computer implemented image processing method, comprising the steps of:

scanning and digitizing an image into a first portion of computer memory;

identifying a plurality of specific feature points present in the digitized image, wherein each identified specific feature point corresponds to at least one distinct image feature, including right and left eyes and a mouth, present within the digitized image;

determining an image searching range for each image feature, including the mouth, facial contours horizontally adjacent the mouth and eyes, based on the identified specific feature points and a predetermined set of feature-classification dependent rules, wherein the image searching range for said facial contours horizontally adjacent the mouth and eyes is determined based on a difference between vertical positions of the specific feature point for each eye and the mouth;

extracting feature characteristics corresponding to each image feature, including the mouth, by evaluating digitized image portions defined by the determined source searching ranges;

determining whether the extracted mouth is correct by determining whether a line connecting right and left end points in the x-axis direction of the mouth is greater than a predetermined angle relative to a line through a particular point in each of the right and left eyes; and storing the extracted feature characteristics as coordinate data within a second portion of the computer memory.

34. The method of claim 33, wherein the image source comprises a facial image and the image features further include eyebrows.

35. The method of claim 34, wherein said feature point identification step comprises:

displaying the digitized facial image to a user; and capturing user input based on the displayed image, the user input comprising relative position coordinates of the mouth and eyes of the digitized facial image.

36. The method of claim 33, wherein the image searching range determining step for the mouth feature comprises:

calculating a difference between horizontal positions of the specific feature point for each eye; and determining the image searching range for the mouth based on the calculated difference.

37. The method of claim 33, wherein said image searching range determining step for the mouth comprises:

calculating a first difference between horizontal positions of the specific feature point for each eye;

calculating a second difference between vertical positions of the specific feature points for the mouth and each eye; and determining the image searching range for the mouth based on the first and second calculated differences and the specific feature point for the mouth.

38. The method of claim 33, wherein the image searching range determining step for a given eye comprises:

calculating a difference between horizontal positions of the specific feature point for each eye; and determining the image searching range for the given eye based on the calculated difference and the specific feature point of the given eye.

39. The method of claim 34, wherein the image searching range determining step for a given eyebrow comprises:

calculating a difference between horizontal positions of the specific feature point for each eye; and determining the image searching range for the given eyebrow based on the calculated difference and the specific feature point of the eye positioned closest to the given eyebrow.

40. The method of claim 34, further comprising evaluating the coordinate data for at least one feature against the corresponding specific feature point to determine whether the feature was correctly extracted.

41. A computer implemented image processing method, comprising the steps of:

scanning and digitizing a facial image into a first portion of computer memory;

identifying a plurality of specific feature points present in the digitized facial image, wherein each identified specific feature point corresponds to at least one distinct facial image feature, including at least a mouth, present within the digitized image;

determining an image searching range for each facial image feature based on the identified specific feature points and a predetermined set of feature-classification dependent rules;

extracting feature characteristics corresponding to each image feature by evaluating digitized image portions defined by the determined source searching ranges;

storing the extracted feature characteristics as coordinate data within a second portion of the computer memory; and evaluating the coordinate data for at least one facial feature against the corresponding specific feature point to determine whether the feature was correctly extracted, wherein the coordinate data evaluating step comprises:

retrieving coordinate data corresponding to the mouth of the digitized facial image;

identifying mouth corner points within the retrieved coordinate data;

calculating a lip cusp based on the identified mouth corner points;

determining whether the lip cusp is positioned underneath either of the identified mouth corner points; and setting an additional searching range for extracting an upper lip portion of the mouth when it is determined in said lip cusp positioning determining step that the lip cusp is positioned beneath one of the identified mouth corner points.

42. A computer implemented image processing method, comprising the steps of:

scanning and digitizing a facial image into a first portion of computer memory;

identifying a plurality of specific feature points present in the digitized facial image, wherein each identified specific feature point corresponds to at least one distinct facial image feature, including at least right and left eyes and a mouth, present within the digitized image;

determining an image searching range for each facial image feature, including the mouth, based on the identified specific feature points and a predetermined set of feature-classification dependent rules;

extracting feature characteristics corresponding to each image feature, including the mouth, by evaluating digitized image portions defined by the determined source searching ranges;

storing the extracted feature characteristics as coordinate data within a second portion of the computer memory; and evaluating the coordinate data for at least one facial feature against the corresponding specific feature point to determine whether the feature was correctly extracted, wherein the coordinate data evaluating step comprises:

retrieving coordinate data corresponding to the mouth of the digitized facial image;

determining whether the retrieved coordinate data includes the specific feature point for the mouth; and determining whether a line connecting right and left end points in the x-axis direction of the mouth is greater than a predetermined angle relative to a line through a particular point in each of the right and left eyes.

43. The method of claim 40, wherein the coordinate data evaluating step comprises:

retrieving coordinate data corresponding to a given eye of the digitized facial image; and determining whether the retrieved coordinate data includes the specific feature point for the given eye.

44. The method of claim 40, wherein the coordinate data evaluating step comprises:

retrieving coordinate data corresponding to a given eyebrow of the digitized facial image; and determining whether the retrieved coordinate data is within a predetermined distance from the specific feature point for an eye closest to the given eyebrow.

45. An article of manufacture, comprising a computer usable medium having readable code embodied therein for processing a digitized image, the computer readable program code comprising:

computer readable program code for identifying a plurality of specific feature points present in the digitized image, wherein each identified specific feature point corresponds to at least one distinct image feature, including right and left eyes and a mouth, present within the digitized image;

computer readable program code for determining an image searching range for each image feature, including a mouth and facial contours horizontally adjacent the mouth and eyes, based on the identified specific feature points and a predetermined set of feature-classification dependent rules, wherein the image range for said facial contours horizontally adjacent the mouth and eyes is determined based on a difference between vertical positions of the specific feature point for each eye and the mouth;

computer readable program code for extracting feature characteristics corresponding to each image feature, including the mouth, by evaluating digitized image portions defined by the determined source searching ranges;

computer readable program code for determining whether the extracted mouth is correct by determining whether a line connecting right and left end points in the x-axis direction of the mouth is greater than a predetermined angle relative to a line through a particular point in each of the right and left eyes; and computer readable program code for storing the extracted feature characteristics as coordinate data within computer memory.

46. The article of manufacture of claim 45, wherein the image source comprises a facial image and the image features further include eyebrows.

47. The article of manufacture of claim 46, wherein said computer readable specific feature points identification code comprises:

computer readable program code for displaying the digitized facial image to a user; and computer readable program code for capturing user input based on the displayed image, the user input comprising relative position coordinates of the mouth and eyes of the digitized facial image.

48. The article of manufacture of claim 45, wherein said computer readable image searching range determining code, for the mouth feature, comprises:

computer readable program code for calculating a difference between horizontal positions of the specific feature point for each eye; and computer readable program code for determining the image searching range for the mouth based on the calculated difference.

49. The article of manufacture of claim 45, wherein said computer readable image searching range determining code, for the mouth feature, comprises:

computer readable program code for calculating a first difference between horizontal positions of the specific feature point for each eye;

computer readable program code for calculating a second difference between vertical positions of the specific feature points for the mouth and each eye; and computer readable program code for determining the image searching range for the mouth based on the first and second calculated differences and the specific feature point for the mouth.

50. The article of manufacture of claim 45, wherein said computer readable image searching range determining code, for a given eye feature, comprises:

computer readable program code for calculating a difference between horizontal positions of the specific feature point for each eye; and computer readable program code for determining the image searching range for the given eye based on the calculated difference and the specific feature point of the given eye.

51. The article of manufacture of claim 46, wherein said computer readable image searching range determining code, for a given eyebrow feature, comprises:

computer readable program code for calculating a difference between horizontal positions of the specific feature point for each eye; and computer readable program code for determining the image searching range for the given eyebrow based on the calculated difference and the specific feature point of the eye positioned closest to the given eyebrow.

52. The article of manufacture of claim 46, further comprising computer readable program code for evaluating the coordinate data for at least one feature against the corresponding specific feature point to determine whether the feature was correctly extracted.

53. An article of manufacture, comprising a computer usable medium having readable code embodied therein for processing a digitized image, the computer readable program code comprising:

computer readable program code for identifying a plurality of specific feature points present in the digitized image, wherein each identified specific feature point corresponds to at least one distinct image feature, including at least a mouth, present within the digitized image;

computer readable program code for determining an image searching range for each image feature based on the identified specific feature points and a predetermined set of feature-classification dependent rules;

computer readable program code for extracting feature characteristics corresponding to each image feature by evaluating digitized image portions defined by the determined source searching ranges;

computer readable program code for storing the extracted feature characteristics as coordinate data within computer memory: and computer readable code for evaluating the coordinate data for at least one feature against the corresponding specific feature point to determine whether the feature was correctly extracted, wherein said computer readable coordinate data evaluating code comprises:

computer readable program code for retrieving coordinate data corresponding to the mouth of the digitized facial image;

computer readable program code for identifying mouth corner points within the retrieved coordinate data;

computer readable program code for calculating a lip cusp based on the identified mouth corner points;

computer readable program code for determining whether the lip cusp is positioned underneath either of the identified mouth corner points; and computer readable program code for setting an additional searching range for extracting an upper lip portion of the mouth when it is determined by said lip cusp positioning determining means that the lip cusp is positioned beneath one of the identified mouth corner points.

54. The article of manufacture of claim 52, wherein said computer readable coordinate data evaluating code comprises:

computer readable program code for retrieving coordinate data corresponding to the mouth of the digitized facial image; and computer readable program code for determining whether the retrieved coordinate data includes the specific feature point for the mouth.

55. The article of manufacture of claim 52, wherein said computer readable coordinate data evaluating code comprises:

computer readable program code for retrieving coordinate data corresponding to a given eye of the digitized facial image; and computer readable program code for determining whether the retrieved coordinate data includes the specific feature point for the given eye.

56. The article of manufacture of claim 52, wherein said computer readable coordinate data evaluating code comprises:

computer readable program code for retrieving coordinate data corresponding to a given eyebrow of the digitized facial image; and computer readable program code for determining whether the retrieved coordinate data is within a predetermined distance from the specific feature point for an eye closest to the given eyebrow.

* * * * *

UNITED STATES PATENT AND TRADEMARK OFFICE
CERTIFICATE OF CORRECTION

PATENT NO.    : 5,933,527
DATED         : August 03, 1999
INVENTOR(S)   : Masaki Ishikawa It is certified that an error appears in the above identified patent and that said Letters Patent is hereby corrected as shown below:

Column 26, line 36 - 37, change "middle contour point if the position of the" to --two adjacent contour points are--.

Signed and Sealed this

Twenty-fifth Day of January, 2000

Attest:

Attesting Officer    Acting Commissioner of Patents and Trademarks